United States Patent
Li et al.

(10) Patent No.: US 9,986,377 B2
(45) Date of Patent: *May 29, 2018

(54) GEOFENCES BASED ON RF FINGERPRINTS

(71) Applicant: QUALCOMM Incorporated, San Diego, CA (US)

(72) Inventors: Xintian Li, Santa Clara, CA (US); Marc Anthony Ische, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/192,490

(22) Filed: Jun. 24, 2016

(65) Prior Publication Data

US 2016/0309294 A1    Oct. 20, 2016

Related U.S. Application Data

(63) Continuation of application No. 14/056,780, filed on Oct. 17, 2013, now Pat. No. 9,386,415.

(Continued)

(51) Int. Cl.
    *H04W 24/00*    (2009.01)
    *H04W 4/02*     (2018.01)
    *H04W 12/08*    (2009.01)
    *G01S 5/02*     (2010.01)
    *H04L 12/26*    (2006.01)
    *H04W 8/26*     (2009.01)
    *H04W 24/10*    (2009.01)
    *H04W 84/12*    (2009.01)

(52) U.S. Cl.
    CPC ........... *H04W 4/021* (2013.01); *G01S 5/0252* (2013.01); *H04L 43/0864* (2013.01); *H04W 4/022* (2013.01); *H04W 8/26* (2013.01); *H04W 12/08* (2013.01); *H04W 24/10* (2013.01); *H04W 84/12* (2013.01)

(58) Field of Classification Search
    CPC ....... H04W 4/02; H04W 64/00; H04W 84/14; H04W 84/16; H04W 88/02; H04W 88/06; H04W 88/08
    USPC ......... 455/456.1, 456.5, 456.6, 552.1, 553.1, 455/554.2
    See application file for complete search history.

(56) References Cited

U.S. PATENT DOCUMENTS 8,019,356 B2    9/2011    Lamba et al.
8,463,297 B2    6/2013    Bull et al.
(Continued)

OTHER PUBLICATIONS

International Search Report and Written Opinion—PCT/US2014/044880—ISA/EPO—Nov. 18, 2014.
(Continued)

*Primary Examiner* — Temica M Beamer
(74) *Attorney, Agent, or Firm* — Silicon Valley Patent Group LLP

(57) ABSTRACT

Systems, apparatus and methods in a mobile device for determining a breach of a geofence is presented. A reference radio frequency (RF) fingerprint is obtained by the mobile device, the reference RF fingerprint defining the geofence. The reference RF fingerprint may be generated by the mobile device or received from a different mobile device. The mobile device scans for RF signals and determines a scanned RF fingerprint based on the scan for RF signals. A breach of the geofence is determined using the reference RF fingerprinting and the scanned RF fingerprint.

31 Claims, 20 Drawing Sheets

Related U.S. Application Data

(60) Provisional application No. 61/847,493, filed on Jul. 17, 2013, provisional application No. 61/847,465, filed on Jul. 17, 2013.

(56) References Cited

U.S. PATENT DOCUMENTS

| | | |
|---|---|---|
| 8,626,187 B2 | 1/2014 | Grosman et al. |
| 9,100,426 B1 | 8/2015 | Fang |
| 2008/0132247 A1 | 6/2008 | Anderson |
| 2008/0159331 A1 | 7/2008 | Mace et al. |
| 2010/0273504 A1 | 10/2010 | Bull et al. |
| 2011/0181470 A1 | 7/2011 | Qiu et al. |
| 2012/0046040 A1 | 2/2012 | Chatterjee |
| 2012/0058826 A1 | 3/2012 | Amaitis et al. |
| 2012/0177010 A1 | 7/2012 | Huang et al. |
| 2012/0309376 A1 | 12/2012 | Huang et al. |
| 2013/0023237 A1 | 1/2013 | Meredith et al. |
| 2013/0090106 A1 | 4/2013 | Mathews |
| 2013/0099977 A1 | 4/2013 | Sheshadri et al. |
| 2013/0132268 A1 | 5/2013 | Cooper et al. |
| 2013/0190018 A1 | 7/2013 | Mathews |
| 2014/0162692 A1 | 6/2014 | Li et al. |
| 2015/0023502 A1 | 1/2015 | Li |
| 2015/0024773 A1 | 1/2015 | Li |
| 2015/0238857 A1 | 8/2015 | Amaitis et al. |

OTHER PUBLICATIONS

International Search Report and Written Opinion—PCT/US2014/044885—ISA/EPO—Nov. 18, 2014.

Transmitter information for one transmitter 700

$$= \begin{Bmatrix} \text{absolute information (such as MAC address) \&} \\ \text{relative information (such as distance information)} \end{Bmatrix}$$

RF fingerprint 150 at one location $$= \left\{ \text{Transmitter information}(transmitter) \Big|_{transmitter=1}^{50} \right\}$$

geofence $$= \left\{ \text{RF fingerprint}(location) \Big|_{location=1}^{100} \right\}$$

FIG. 25

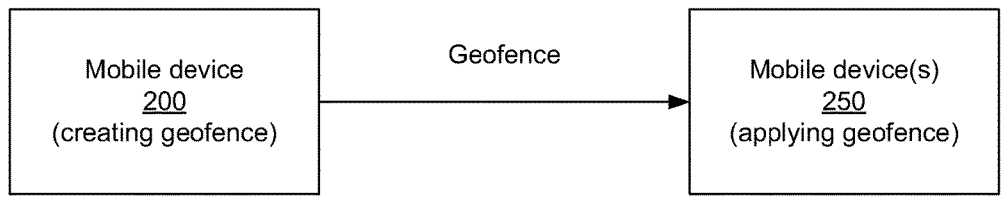

FIG. 26

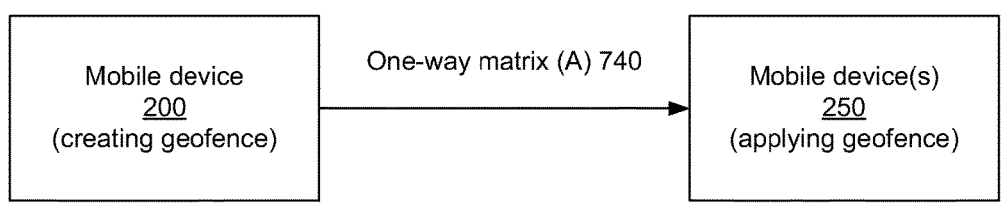

FIG. 27

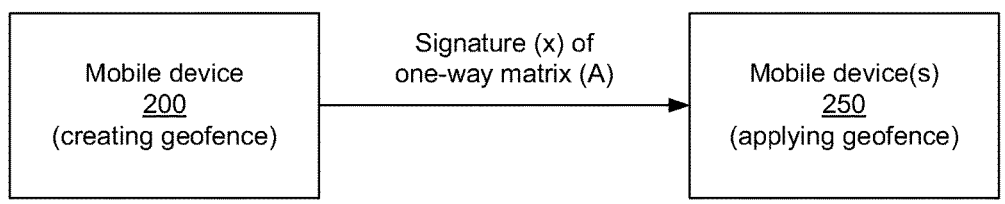

FIG. 28

$$Ax = \underline{0}$$

One-way matrix (A) 740

Signature vector (x) 750

Zero vector (50x64)(64x1)=(50x1)

FIG. 31

Decode 900

Scanned MAC address → (8-byte word) → One-way algorithm 720 (e.g., hash function) → hash (128-byte word) →

$\begin{bmatrix} [2 \text{ bytes}] \\ [2 \text{ bytes}] \\ [2 \text{ bytes}] \\ \vdots \\ [2 \text{ bytes}] \end{bmatrix} = h^T$

One-way vector 760

Signature (x) 750

Encode 800

Decode 900

GEOFENCES BASED ON RF FINGERPRINTS

CROSS-REFERENCE TO RELATED APPLICATIONS

This application is a continuation of co-pending U.S. application Ser. No. 14/056,780, filed Oct. 17, 2013, entitled "Geofences Based on RF Fingerprints," which claims, under 35 USC § 119, the benefit of, and priority to, U.S. Provisional Application No. 61/847,493, filed Jul. 17, 2013, entitled "Method to Wake a Mobile Device Based on an RF Fingerprint," and U.S. Provisional Application No. 61/847,465, filed Jul. 17, 2013, entitled "Method to Generate an RF Signature for a Mobile Device," all of which are assigned to the assignee hereof and are incorporated herein by reference in their entireties. This application is further related to the U.S. application Ser. No. 14/056,788, filed Oct. 17, 2013, entitled "Communicating RF Fingerprint-Based Geofences," which is incorporated by reference herein in its entirety.

BACKGROUND

1. Field of the Invention

This disclosure relates generally to systems, apparatus and methods for geofences, and more particularly to creating and applying a geofence based on WLAN signals.

2. Background

Today's geofence is defined by a circle with a center determined by a GNSS or GPS coordinate (latitude and longitude) and having a radius (R). A mobile device includes a low power consuming modem and a high power consuming application processor. The low power consuming modem contains a global navigation satellite system (GNSS) or global positioning system (GPS) receiver. The high power consuming application processor contains a specific application. The mobile device uses the GNSS receiver to determine when a current location of the mobile device has crossed between inside and outside a geofence. When the mobile device determines it is leaving or entering a geofenced area, the mobile device wakes the high power consuming application processor to execute the specific application.

The above technique will allow high power processor to sleep for most of time, thus saving power. However, there are a few key problems that cannot be solved by this approach. First of all, a GNSS fix may be difficult or impossible (e.g., from deep within a building. Second, a position of a WiFi access point may be unknown. Third, a user does not know GPS coordinate (latitude and longitude) needed to define a geofence. Instead, the user only knows a relative location or physical address (e.g., my living room or a particular set of conference rooms). Fourth, a geofence may not have a fixed location (e.g., on a truck, train or ship). Fifth, a geofence may not be circular such as free formed or other irregular shape. Sixth, transmitting an entire geofence requires excessive power and/or band width usage.

What is needed is a means to create and use a geofence when: (1) GNSS signals are unavailable; (2) an absolute location of a WiFi access point is unknown; (3) GNSS coordinates of a geofence are unknown; (4) a geofence has a non-fixed location; (5) a geofence is of an irregular shape; or (6) power and/or transmission costs need to be wherein the absolute information comprises location information of a plurality of transmitters.

BRIEF SUMMARY

Disclosed are systems, apparatus and methods in a mobile device to create and apply a geofence.

According to some aspects, disclosed is a method of determining a breach of a geofence in a mobile device comprising obtaining, at the mobile device, a reference radio frequency (RF) fingerprint, the reference RF fingerprint defining a geofence; scanning RF signals received by the mobile device; determining a scanned RF fingerprint based on the scanning; and determining if the breach of the geofence has occurred using the reference RF fingerprint and the scanned RF fingerprint.

According to some aspects, disclosed is a mobile device for determining a breach of a geofence, the mobile device comprising at least one of a wireless wide area network (WWAN) transceiver and a wireless local area network (WLAN) transceiver; and a processor coupled to the at least one of the WWAN transceiver and the WLAN transceiver and configured to obtain a reference radio frequency (RF) fingerprint, the reference RF fingerprint defining a geofence, scan for RF signals with the at least one of the WWAN transceiver and the WLAN transceiver, determine a scanned RF fingerprint based on the scan for RF signals, and determine if the breach of the geofence has occurred using the reference RF fingerprint and the scanned RF fingerprint.

According to some aspects, disclosed is a mobile device for determining a breach of a geofence, the mobile device comprising means for obtaining, at the mobile device, a reference radio frequency (RF) fingerprint, the reference RF fingerprint defining a geofence; means for scanning RF signals received by the mobile device; means for determining a scanned RF fingerprint based on the scanning; and means for determining if the breach of the geofence has occurred using the reference RF fingerprint and the scanned RF fingerprint.

According to some aspects, disclosed is a non-transient computer-readable storage medium including program code stored thereon for a mobile device to determine a breach of a geofence, comprising program code to obtain, at the mobile device, a reference radio frequency (RF) fingerprint, the reference RF fingerprint defining a geofence; scan for RF signals received by the mobile device; determine a scanned RF fingerprint based on the scan for RF signals; and determine if the breach of the geofence has occurred using the reference RF fingerprint and the scanned RF fingerprint.

BRIEF DESCRIPTION OF THE DRAWING

Embodiments of the invention will be described, by way of example only, with reference to the drawings.

FIG. 25 shows a transition from transmitter information to a geofence, in accordance with some embodiments of the present invention.

FIGS. 26-28 show various ways to transmit a geofence, in accordance with some embodiments of the present invention.

FIG. 31 shows a relationship between a one-way matrix (A) and a signature (x), in accordance with some embodiments of the present invention.

FIG. 32 shows a method to decode a scanned MAC addresses by applying a one-way algorithm, in accordance with some embodiments of the present invention.

FIG. 33 shows a relationship between a hash vector (h) and a signature (x), in accordance with some embodiments of the present invention.

DETAILED DESCRIPTION

Figure 1:
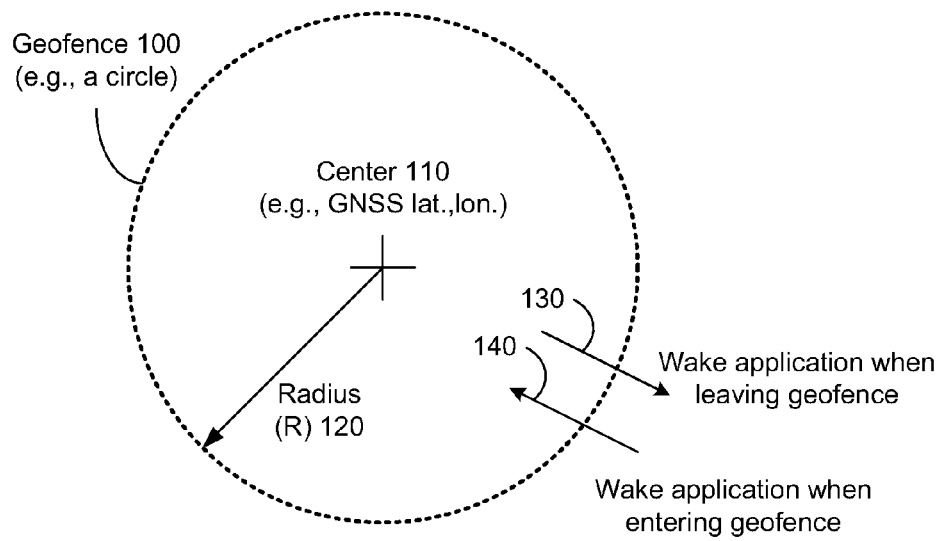
FIG. 1 shows a geofence circle defined by a GNSS center and a radius.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

FIG. 1 shows a geofence circle 100, for example, defined by a GNSS center 110 and a radius (R) 120. Historically, a geofence 100 has been defined by a GNSS center 110 (latitude, longitude) and a fixed radius (R) 120. A mobile device wakes a specific user application in the mobile device whenever the geofence 100 is crossed (that is, when leaving 130 a geofenced area and/or entering 140 a geofence area).

Figure 2:
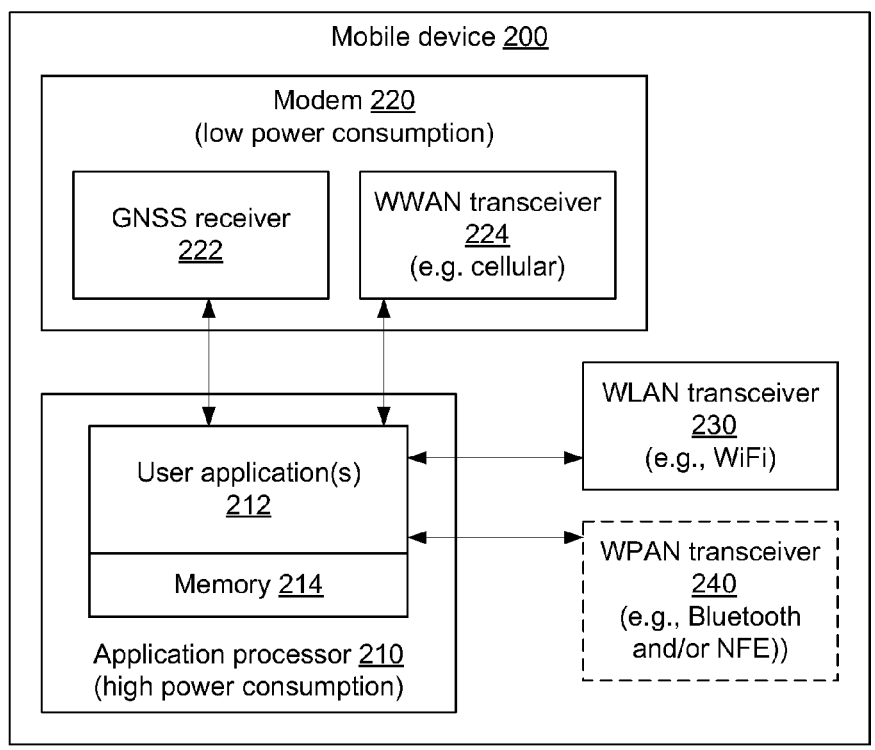
FIG. 2 shows a block diagram of a mobile device.

FIG. 2 shows a block diagram of a first mobile device 200 creating a geofence (or a second mobile device 250 using the geofence). The first mobile device 200 includes an application processor 210, a modem 220 and a wireless local area network transceiver (WLAN transceiver 230).

The application processor 210 is a high power consumption part of the first mobile device 200 and executes one or more user applications 212 and code found in memory 214. The memory 214 includes program code to execute steps described herein. The memory 214 may be integrated with and/or separate from the application processor 210 and may be separate memory or contiguous memory.

The modem 220 is a low power consumption part of the first mobile device 200 and includes a GNSS receiver 222 and a wireless wide area network transceiver (WWAN transceiver 224) (e.g., a cellular transceiver). The application processor 210, when enabled, consumes more power than the modem 220, when enabled.

The WLAN transceiver 230 (e.g., a WiFi receiver or a WiFi transceiver) operates separately from the high power consuming application processor 210 and the low power consuming modem 220.

The first mobile device 200 may also include an optional (as indicated with a dotted box) wireless personal area network transceiver (PAN transceiver 240) (e.g., providing a Bluetooth transceiver and/or a near field effect (NFE) transceiver.

Figure 3:
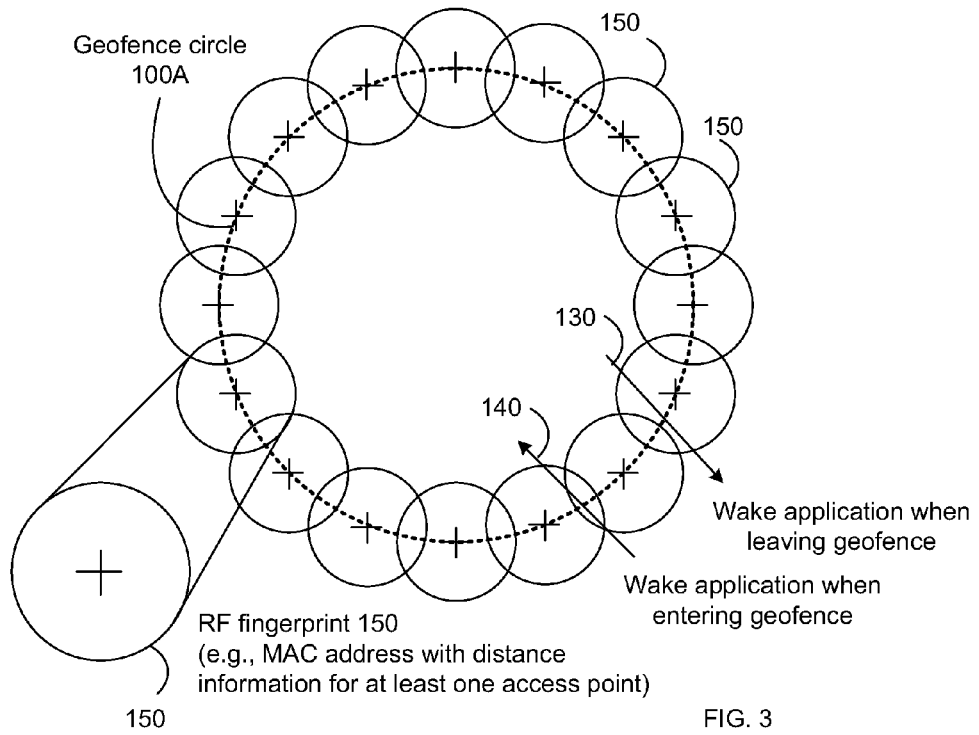
FIG. 3 shows a geofence circle define by a plurality of RF fingerprints, in accordance with some embodiments of the present invention.

FIG. 3 shows a geofence circle 100A define by a plurality of RF fingerprints 150, in accordance with some embodiments of the present invention. Instead of a geofence 100 being defined with GNSS center 110 and a radius (R) 120, a geofence 100 is defined by a set of one or more overlapping and/or non-overlapping areas where each area is defined by an RF fingerprint 150. The RF fingerprint 150 may be defined by a coarse or fine granularity, as described below. A geofence 100 may be any arbitrary shape and size. A first mobile device 200 creates and collects an RF fingerprint 150 at one location from one or more received signals from a corresponding one or more transmitters separate from the second mobile device 250. The one or more transmitters may be one or more WWAN, WLAN and/or PAN transmitters.

For example, if the RF fingerprint 150 is comprised of only received WLAN signals (e.g., from access points), the first mobile device 200 may collect one or more MAC addresses (media access control address) to uniquely identify each access point. Optionally, the first mobile device 200 may also determine distance information, such as an RSSI (received signal strength indicator) and/or RTT (round-trip time) to further define a location via an RF fingerprint 150. A record of the RF environment at a location may uniquely identify the location. With an added uncertainty, coarseness, or granularity, the RF environment defines an area.

One or more areas define a geofence 100. When a second mobile device 250 crosses this defined geofence, either leaving 130 or entering 140, the second mobile device 250 wakes one or more user applications 212. Information that uniquely identifies a transmitter or location is saved as "absolute information."

A device may communicate the absolute information along a first path. For example, a second mobile device 250 may receive one or more geofences 100 in an information or setup message. The absolute information may later be used to determine the absolute location of a transmitter (e.g., latitude and longitude of an access point or cellular base station or a MAC address for a table lookup).

Information that describes the relationship between these transmitters and the first mobile device 200 is saved as "relative information." Relative information may later be used to determine the relative distances (e.g., in terms of RSSI and/or RTT) to these transmitters. Therefore, the absolute information corresponds to a location of a transmitter and relative information corresponds to a distance between each of these transmitters and the first mobile device 200. A device may communicate the relative information along a second path. For example, the relative information may be included in assistance data and received along a path normally used for such assistance data.

Figure 4:
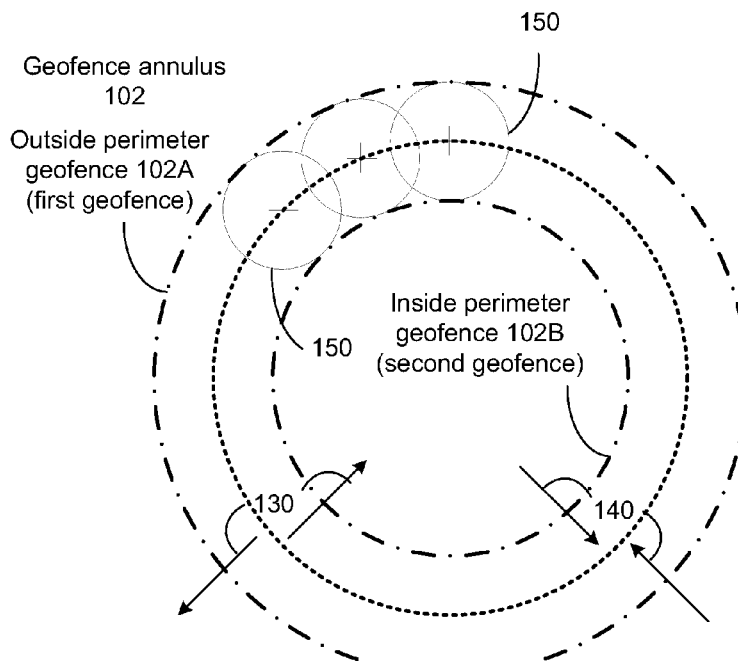
FIG. 4 shows a geofence annulus, in accordance with some embodiments of the present invention.

FIG. 4 shows a geofence annulus 102, in accordance with some embodiments of the present invention. This geofence 100 is shown as an annulus. An annulus is formed by the area bounded between two concentric circles (i.e., an outside perimeter geofence 102A and an inside perimeter geofence 102B). The outside perimeter geofence 102A of the annulus may be viewed as a first geofence. The inside perimeter geofence 102B of the annulus may be viewed as a second geofence. The first geofence and second geofence may operate such that a second mobile device 250 must be within the geofence annulus 102 before triggering a specific application. The application may be triggered by exiting 130 the annulus or entering 140 the annulus.

Figure 5:
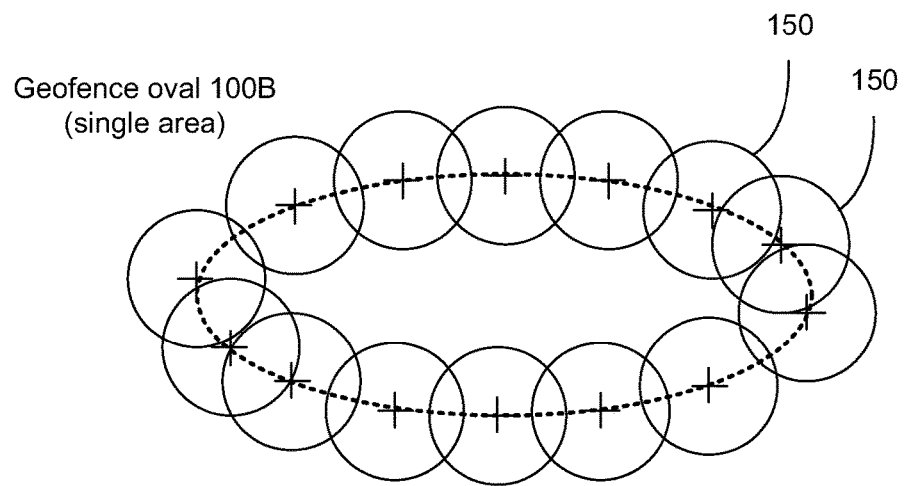
FIG. 5 shows a geofence oval, in accordance with some embodiments of the present invention.

FIG. 5 shows a geofence oval 100B, in accordance with some embodiments of the present invention. A geofence oval 100B may be made up of several overlapping RF fingerprints 150. In this case a geofence 100 forms a geofence oval 100B.

Figure 6:
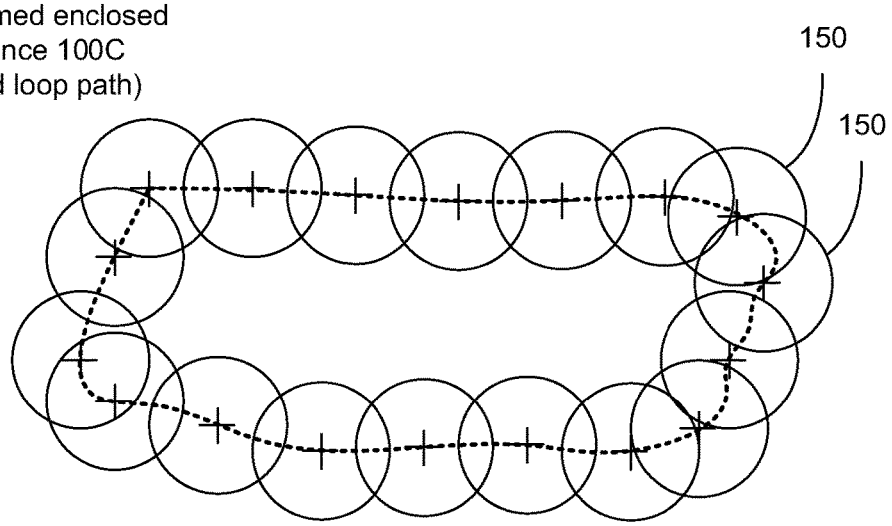
FIG. 6 shows a free-formed and enclosed geofence, in accordance with some embodiments of the present invention.

FIG. 6 shows a free-formed enclosed geofence 100C, in accordance with some embodiments of the present invention. In this case, the geofence 100 is has an arbitrary shape and defines an enclosed area. A geofence 100 may define a set shape and either an enclosed area or a non-closed area.

Figure 7:
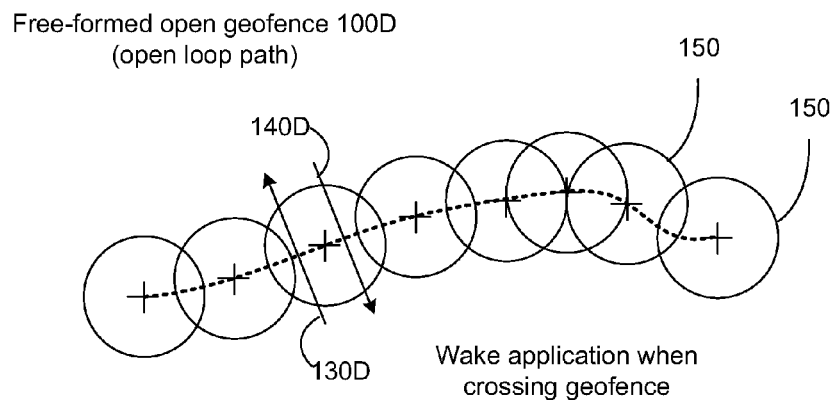
FIG. 7 shows a free-formed open geofence, in accordance with some embodiments of the present invention.

FIG. 7 shows a free-formed open geofence 100D, in accordance with some embodiments of the present invention. A geofence 100 does not necessarily need to form an enclosed area. A geofence 100 may be placed across an entrance, door or opening to a building, office or conference room. A geofence 100 may be placed across a road or pathway. For example, when a second mobile device 250 crosses a geofence sent up across a public entrance of a building, a user application 212 may be triggered to notify, for example, someone in the building to welcome the individual carrying the second mobile device 250. A user application 212 may trigger based on crossing the geofence in a first direction 130D and/or in a second direction 140D.

Figure 8:
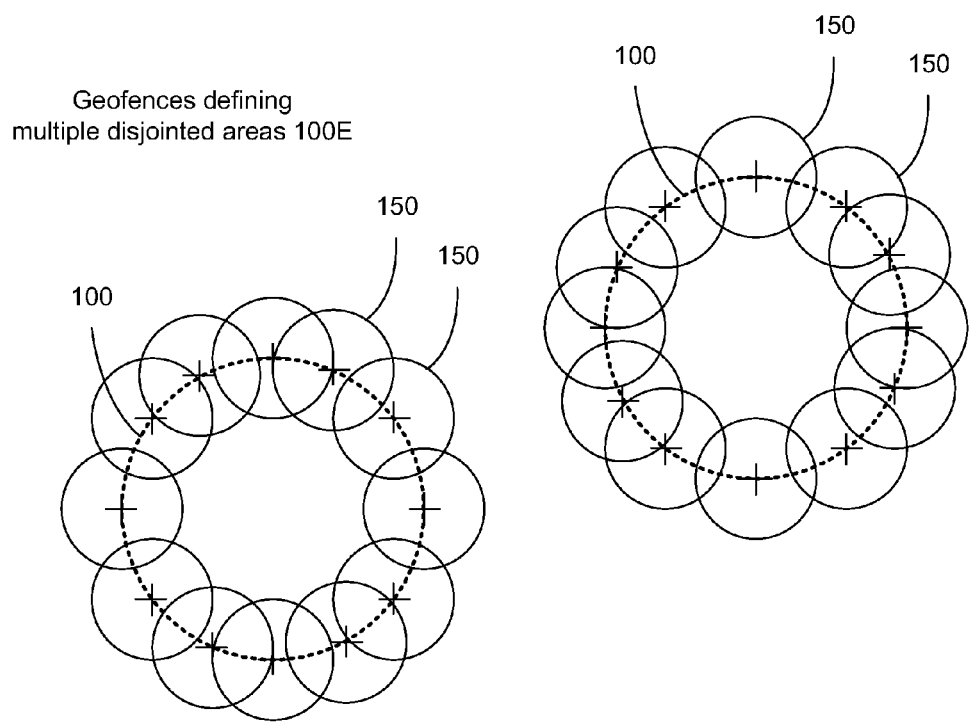
FIG. 8 shows multiple geofences, in accordance with some embodiments of the present invention.

FIG. 8 shows multiple geofences 100E, in accordance with some embodiments of the present invention. A geofence 100 may be a combination of closed and/or open geofences. In this case, the geofence 100 comprises two closed geofences defining two distinct areas as shown. Each part of the multiple geofences 100E is defined by one or more separate RF fingerprints 150, which overlap to form a separate geofence 100.

Figure 9:
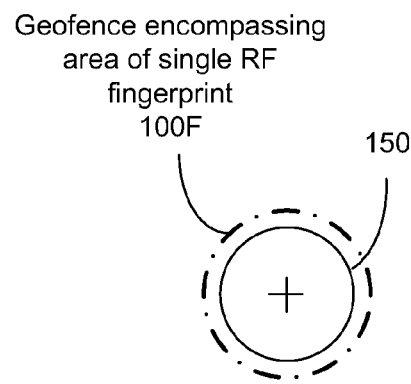
FIG. 9 shows a geofence encompassing a single RF fingerprint, in accordance with some embodiments of the present invention.

FIG. 9 shows a geofence 100F encompassing a single RF fingerprint 150, in accordance with some embodiments of the present invention. A single RF fingerprint 150 with a set uncertainty may be approximated by a circle. In this case, the geofence 100F corresponds to the single RF fingerprint 150 and vice versa.

Figure 10:
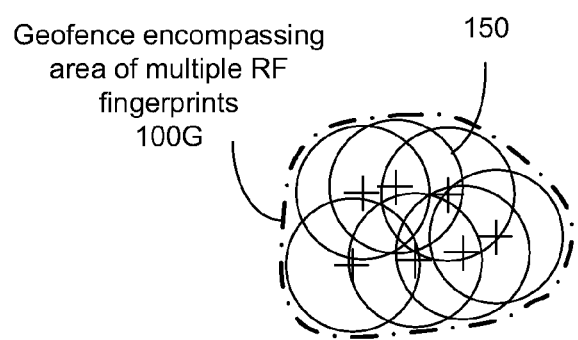
FIG. 10 shows a geofence encompassing a multiple RF fingerprints, in accordance with some embodiments of the present invention.

FIG. 10 shows a geofence 100G encompassing a multiple RF fingerprints 150, in accordance with some embodiments of the present invention. A geofence 100 may "fill" an area to define a geofence at the boarder of the filled area.

Figure 11:
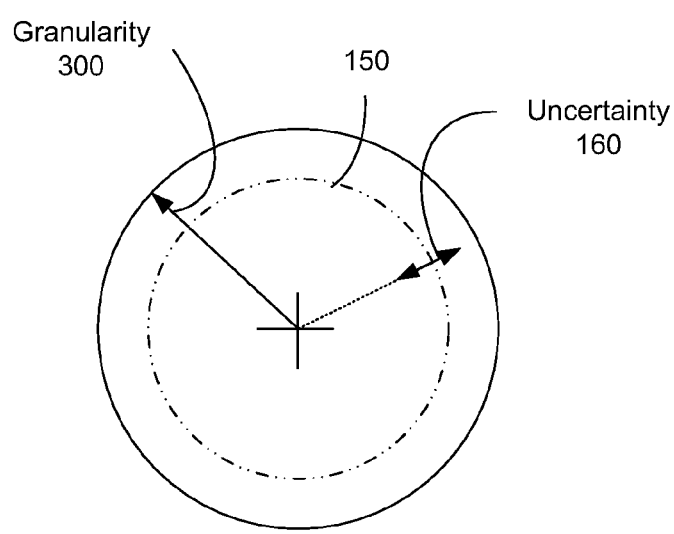
FIG. 11 shows a difference between granularity and uncertainty, in accordance with some embodiments of the present invention.

FIG. 11 shows a difference between granularity 300 and uncertainty 160, in accordance with some embodiments of the present invention. Uncertainty 160 considers how accurate the RF fingerprint 150 may be determined. For example, MAC addresses from several access points may form an RF fingerprint 150 with a high degree of certainty (low uncertainty 160). In this case, the location of a first mobile device 200 is located at the intersection several access points, which only occurs in one tight area. The accuracy may be defined in meters, for example, five meters (corresponding to an uncertainty of 5 meters in location estimation). Granularity 300, on the other hand, is set based on the desired resolution of a geofence 100 and is at least as large or larger than the uncertainty. That is, uncertainty 160 is smaller or equal to granularity 300. As a hypothetical example, consider a certain actual position with a particular uncertainty 160 of an RF fingerprint 150 of ±1.0 meter in each direction such that the actual position may be estimated 50% if the time within an uncertainty of 1 meter of the actual position. On top of this RF fingerprint 150, set a granularity 300 to 10 meters. Therefore, accurate RF readings may be truncated and only coarse measurements or measurements with higher granularity taken.

For example, an RF fingerprint 150 is taken with several pieces of absolute information (e.g., several MAC addresses) to estimate a location within a certain uncertainty 160 (say 10 meters) of an actual location. Now a granularity 300, for example, is set to a city block. Therefore, only more granular signals (say a cell signal or cell signals) need to be examined.

Alternatively, high resolution RF fingerprints 150 may be truncated to represent a resolution set by the granularity 300. In this case, a one-way matrix (A) needs only the more granular or truncated signals. A geofence created or defined by a first mobile device may be communicated directly as one or more received RF fingerprints.

Alternatively, the RF fingerprints may be separated into absolute information (i.e., used to indicate an absolute location of a transmitter) and relative information (i.e., used to indicate a relative distance between the transmitter and mobile device). The absolute information may undergo a one-way function, such as a hash function, and placed as rows of a matrix called a one-way matrix (A). In this case, the geofence may be communicated directly as a one-way matrix (A). Alternatively, the geofence may be communicated directly as a signature (x) of a one-way matrix (A). Further details of a one-way matrix (A) and a signature (x) are described below.

Figure 12:
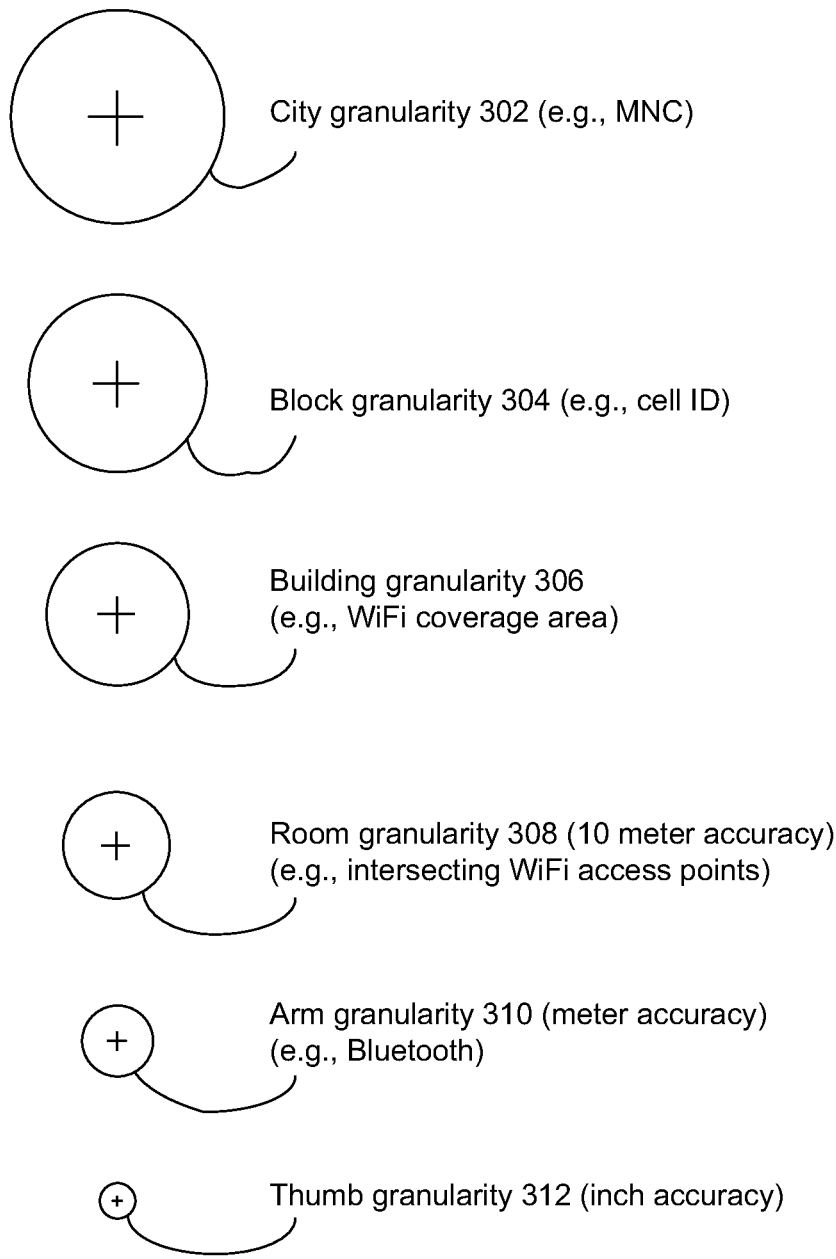
FIG. 12 shows various levels of granularity, in accordance with some embodiments of the present invention.

FIG. 12 shows various levels of granularity 300, in accordance with some embodiments of the present invention. Levels of granularity include: (a) a city granularity 302 (e.g., MNC); (b) a city block granularity 304 (e.g., a cell ID); (c) a building granularity 306 (e.g., a WiFi coverage area); (d) a room granularity 308 (e.g., a 10 meter conference room); (e) an arm granularity 310 (e.g., a 1 meter granularity); and (f) a thumb granularity 312 (e.g., between a distance of a finger and direct contact).

Figure 13:
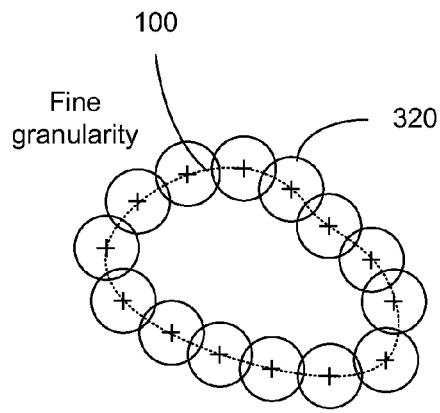
FIGS. 13 and 14 show a geofence with various levels of granularity, in accordance with some embodiments of the present invention.
Figure 14:
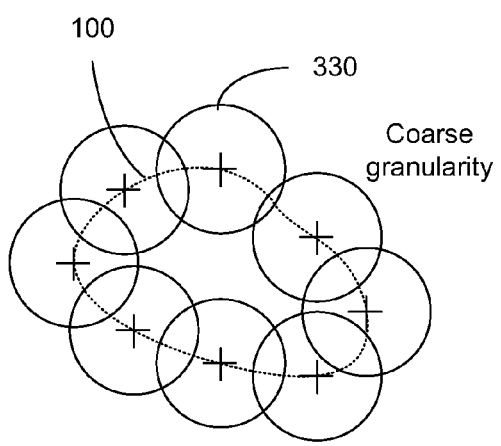

FIGS. 13 and 14 show a geofence 100 with various levels of granularity 300, in accordance with some embodiments of the present invention. In FIG. 13, a fine level 320 of granularity is used to define a geofence 100. In FIG. 14, a coarse 330 of granularity is used to define a geofence even though each RF fingerprint 150 has a lower level of uncertainty 160 than the granularity 300 selected.

Figure 15:
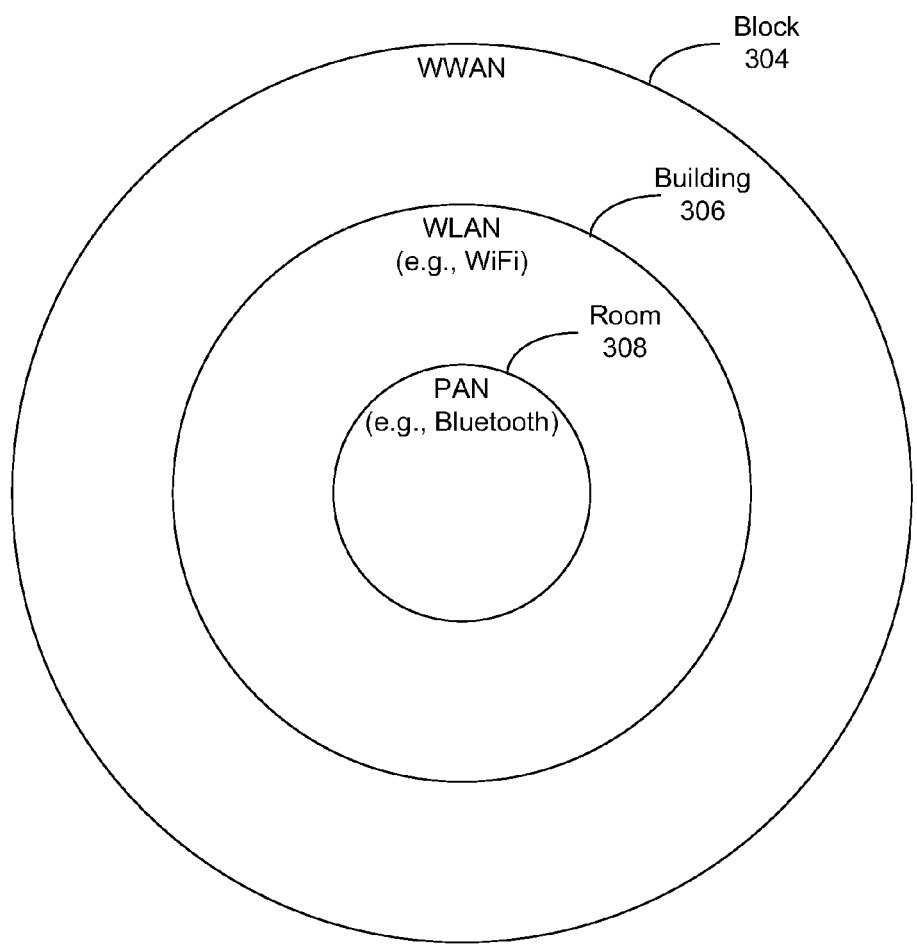
FIG. 15 shows relative levels of granularity of transmitters, in accordance with some embodiments of the present invention.

FIG. 15 shows relative levels of granularity 160 of transmitters, in accordance with some embodiments of the present invention. A WWAN (wireless wide area network, e.g., a cell) is coarser than a WLAN (wireless local area network, e.g., WiFi) is coarse than a PAN (personal area network, e.g., Bluetooth). A WWAN may be estimated with a granularity of a block 304. A WLAN may be estimated with a granularity of a building 306. A PAN may be estimated with a granularity of a room 308. Not shown are other levels of granularity 300, for example, a near field system providing a finer granularity than a PAN system.

Figure 16:
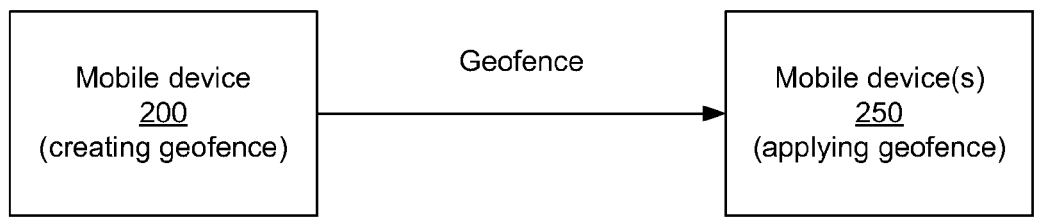
FIGS. 16 and 17 show a first mobile device and second mobile device sharing a geofence 100, in accordance with some embodiments of the present invention.
Figure 17:
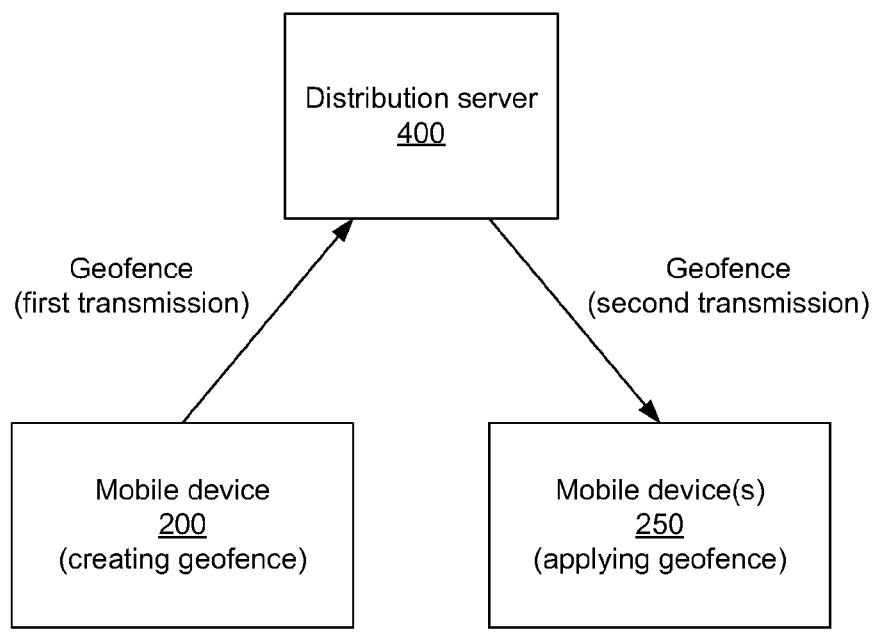

FIGS. 16 and 17 show a first mobile device 200 and second mobile device 250 sharing a geofence 100, in accordance with some embodiments of the present invention. In FIG. 16, a first mobile device 200 defines and sends a geofence directly to one or more mobile devices 250 applying the geofence 100. Alternatively or in addition to the first mobile device 200 defining the geofence 100 may apply the geofence 100 within the first mobile device 200 defining the geofence, therefore, the geofence 100 is not necessarily communicated from the first mobile device 200. Communicating includes sending from a first mobile device 200 and/or receiving at a second mobile device 250.

In FIG. 17, a first mobile device 200 defining the geofence 100 may send the geofence 100 to a distribution server 400 in a first transmission. The distribution server 400 distributes the geofence 100 to one or more mobile devices 250 applying the geofence 100 in a second transmission. The geofence 100 sent to the distribution server 400 in the first transmission may be the same as the geofence 100 distribute by the distribution server 400 in the second transmission. Alternatively for the second transmission, the distribution server 400 may set a higher level of encryption, encoding or other means of hiding the geofence 100 than used in sending the first transmission.

Figure 18:
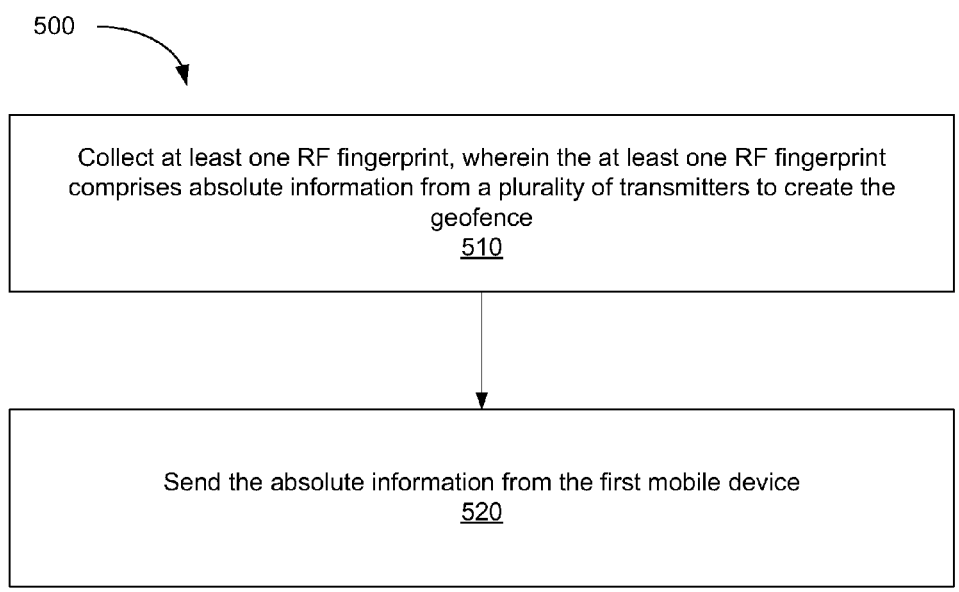
FIGS. 18 and 19 show methods to define and use a geofence, in accordance with some embodiments of the present invention.
Figure 19:
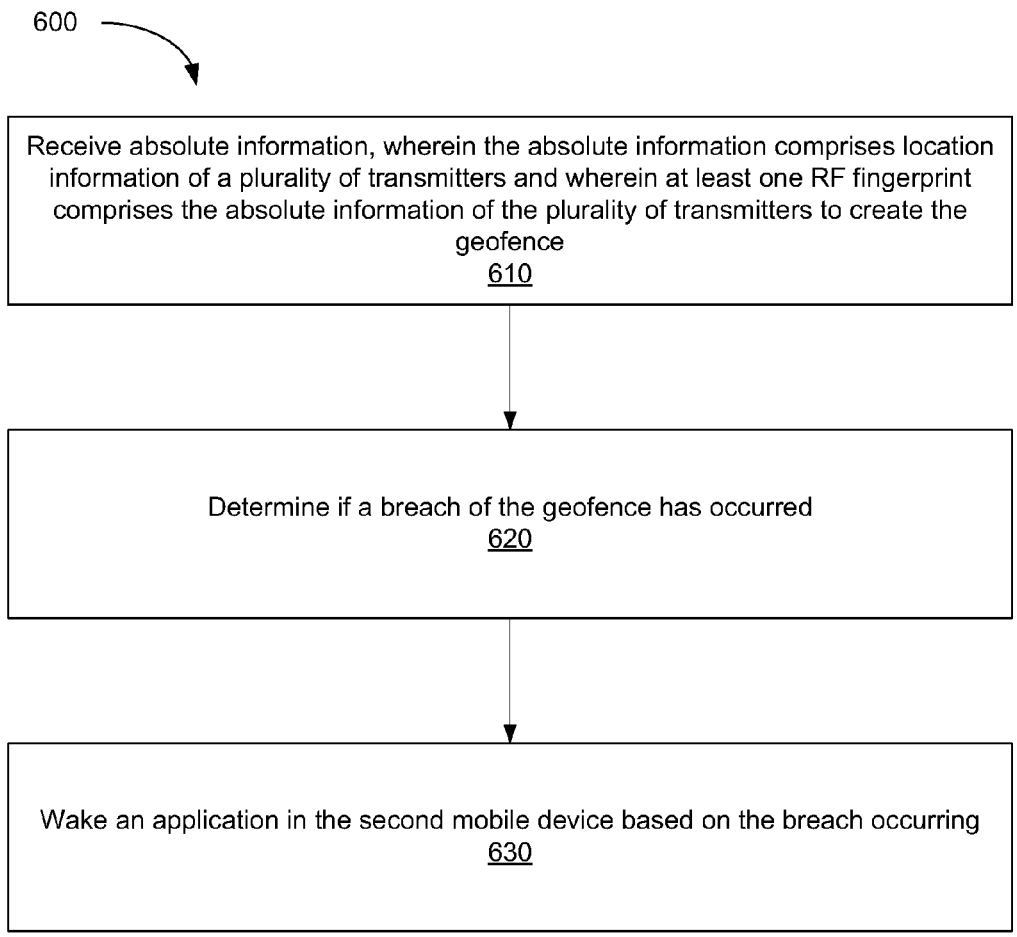

FIGS. 18 and 19 show methods to define and use a geofence 100, in accordance with some embodiments of the present invention. In FIG. 18, shown is a method 500 in a first mobile device 200 for defining a geofence 100. At 510, the first mobile device 200 collects at least one RF fingerprint 150, wherein the at least one RF fingerprint 150 comprises absolute information from a plurality of transmitters to create the geofence. At 520, the first mobile device 200 sends the absolute information from the first mobile device.

In some embodiment, the first mobile device 200 may also send relative information from the first mobile device 200 to a second mobile device 250, wherein the at least one RF fingerprint further comprises the relative information. The relative information may comprise distance information between the first mobile device 200 and the plurality of transmitters. The first mobile device 200 sending the relative information from the first mobile device 200 to the second mobile device 250 may comprise sending the relative information from the first mobile device 200 to a location server for inclusion in assistance data sent to the second mobile device 250. The first mobile device 200 may comprise sending the absolute information from the first mobile device 200 via a first path, and sending the relative information from the first mobile device 200 to the second mobile device 250 via a second path different from the first path.

In some embodiments, the geofence defines multiple disjointed areas. In some embodiments, the at least one RF fingerprint 150 comprises a plurality of RF fingerprints around at least one closed path. In some embodiments, the at least one RF fingerprint comprises a plurality of RF fingerprints along at least one open-loop path. In some embodiments, the absolute information comprises a granularity value, for example, any one of: a city granularity, a block granularity, a building granularity, a room granularity, an arm granularity, and a thumb granularity. The at least one RF fingerprint may comprise an NFC identifier (near-field communication identifier). The absolute information may comprise information to uniquely identify each of the plurality of transmitters. The absolute information may comprise a location of each of the plurality of transmitters.

In FIG. 19, shown is a method 600 in a second mobile device 250 for using a geofence 100 created by a first mobile device 200. At 610, the mobile device 250 receives absolute information, wherein the absolute information comprises or can indicate a location information of a plurality of transmitters and wherein at least one RF fingerprint comprises the absolute information of the plurality of transmitters to create the geofence.

At 620, the mobile device 250 determines if a breach of the geofence has occurred. A breach occurs when: (1) leaving a closed geofenced area 130; (2) entering closed geofenced area 140; and/or (3) crossing a geofence in an open or closed area.

At 630, the mobile device 250 wakes an application in the second mobile device based on the breach occurring.

The mobile device 250 may also receive relative information from the first mobile device 200 at the second mobile device 250, wherein the at least one RF fingerprint may further comprises the relative information. The mobile device 250 may receive the relative information from the first mobile device at a location server in assistance data from a location server. The mobile device 250 may receive the absolute information from the first mobile device via a first path, and receive the relative information from the first mobile device at the second mobile device via a second path different from the first path. The absolute information may comprise a granularity value.

FIGS. 20-24 show an RF fingerprint, in accordance with some embodiments of the present invention. A first mobile device 200 (the mobile device that is collecting RF fingerprints to define or create one or more geofences) records an identifier of each transmitter 700.

Figure 20:
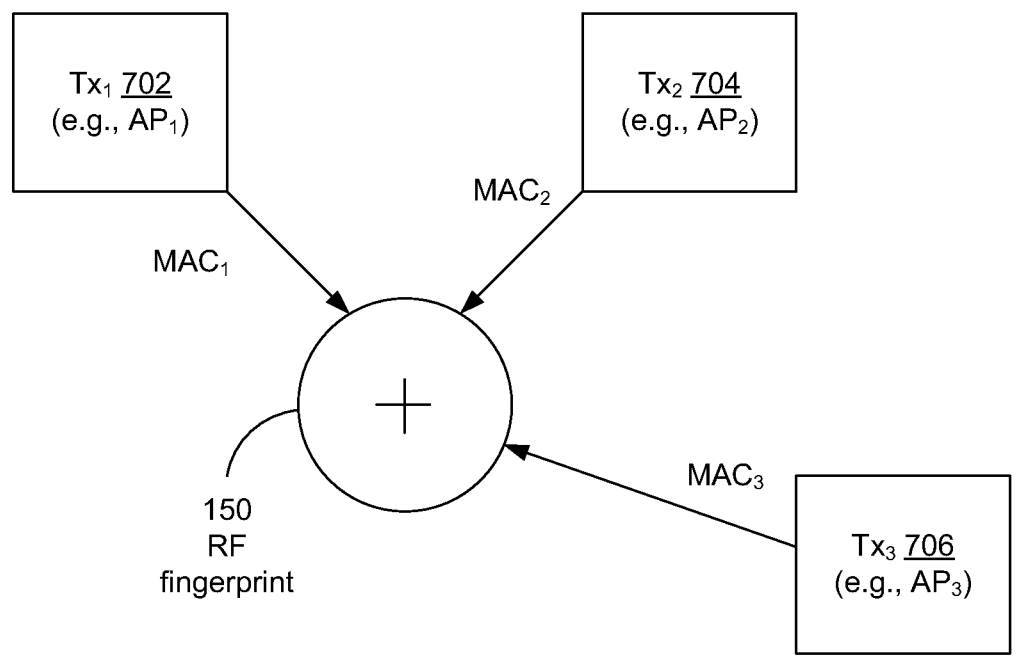
FIGS. 20-24 show an RF fingerprint, in accordance with some embodiments of the present invention.

In FIG. 20, a first transmitter 702 (TX$_1$), a second transmitter 704 (TX$_2$) and a third transmitter 706 (TX$_3$) transmit information that identifies the respective transmitter 700 (also referred to as absolute information). The distance between the transmitter and the first mobile device 200 defines relative information. Such relative information is optional and identifies where the first mobile device 200 is with respect to the transmitter 700. For example, a first access point (AP$_1$) broadcasts its unique MAC address (MAC$_1$). A second access point (AP$_2$) broadcasts its unique MAC address (MAC$_2$). A third access point (AP$_3$) broadcasts its unique MAC address (MAC$_3$). In this case, the RF fingerprint 150 may be defined by the three MAC addresses.

Figure 21:
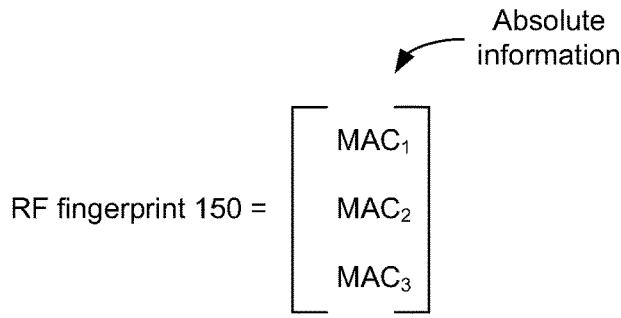
Figure 22:
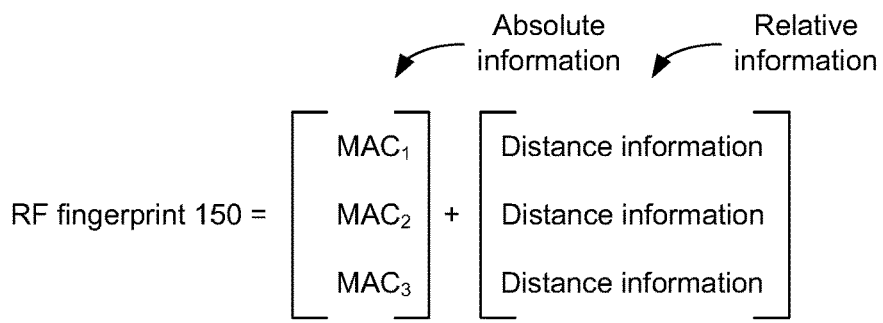
Figure 23:
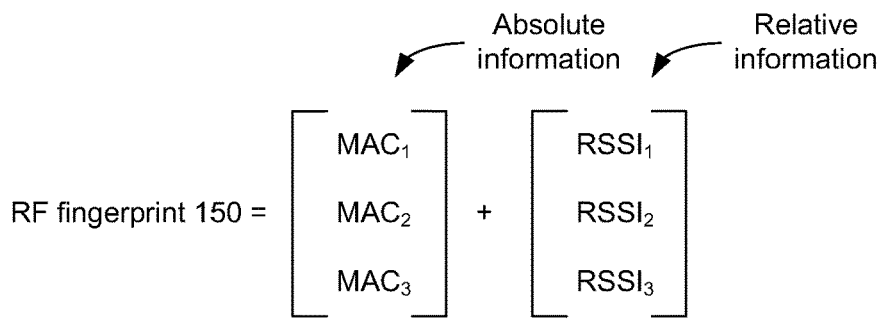
Figure 24:
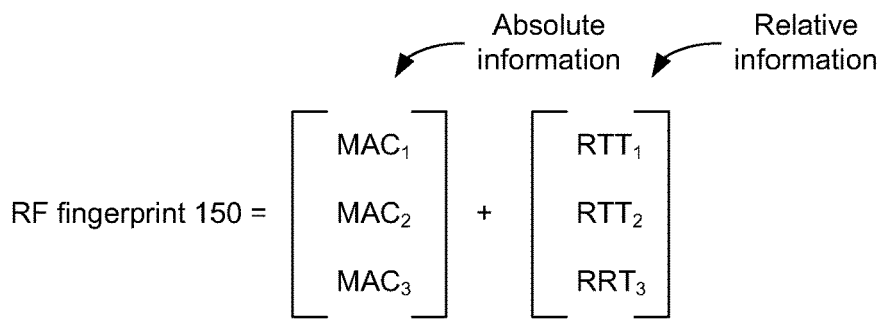

FIG. 21 shows three MAC addresses defining an example RF fingerprint 150. The RF fingerprint 150 includes absolute information. In this case, an RF fingerprint 150 is defined by a set of MAC addresses {MAC$_1$, MAC$_2$, MAC$_3$}. FIG. 22 shows the RF fingerprint 150 may optionally be expanded to include relative information. The relative information in this example is distance information. FIG. 23 shows this distance information may be RSSI values. In this case, the RF fingerprint 150 is defined by a set of MAC addresses {MAC$_1$, MAC$_2$, MAC$_3$} along with a corresponding set of RSSI values {RSSI$_1$, RSSI$_2$, RSSI$_3$}. Similarly, FIG. 24 shows this distance information may be RTT values. In this case, the RF fingerprint 150 is defined by a set of MAC addresses {MAC$_1$, MAC$_2$, MAC$_3$} along with a corresponding set of RTT values {RTT$_1$, RTT$_2$, RTT$_3$}.

FIG. 25 shows a transition from transmitter information to a geofence, in accordance with some embodiments of the present invention. Transmitter information includes absolute information. Absolute information may be used to define an absolute location. Transmitter information may also include relative information. Relative information may be used to define a distance from an absolute location. For example, the relative information may be an RTT and/or RSSI. Transmitter information collected from a single location from several transmitters 700 comprises an RF fingerprint 700. That is, an RF fingerprint 150 includes transmitter information from multiple transmitters as received at a particular location. For example purposes, space for up to an arbitrary 50 transmitters is considered. A set of RF fingerprints 150 from one or more various locations along a path forms a geofence. A geofence includes a variable number of locations each containing an RF fingerprint 150. The example shown shows RF fingerprints 150 from an arbitrary number of 100 locations.

FIGS. 26-28 show various ways to transmit a geofence, in accordance with some embodiments of the present invention. A first mobile device 200 may send a second mobile device 250: (1) a geofence in the clear (FIG. 26)—no privacy; (2) a one-way matrix (A) 740 for the geofence (FIG. 27)—some privacy; or (3) a signature (x) 750 of the one-way matrix (A) 740 of the geofence—strong privacy. An intermediary distribution server 400, as previously discussed, may be placed between the first mobile device 200 and the second mobile device 250 in order to perform the one-way function of a geofence and/or provide the signature (x) 750 of a one-way matrix (A) 740 and/or distribute the geofence (in the form of a geofence, a one-way matrix (A) 740 or a signature (x) 750) to one or more second mobile devices 250 as they become available or request the geofence.

In FIG. 26, a geofence is transmitted without encrypting or hiding the absolute information of the geofence. That is, a geofence may be transmitted from a first mobile device 200 defining or creating a geofence to one or more second mobile devices 250 using or applying the geofence. When a geofence is transmitted in the clear, the second mobile devices 250 receiving and applying the geofence directly know the locations of the geofence from the communicated geofence.

In FIG. 27, a one-way matrix (A) 740 (e.g., hashed matrix) is communicated. A hash function is used here as an example of a one-way function. The absolute information is collected by a first mobile device 200 or an intermediary distribution server 400. The absolute information is hashed by the first mobile device 200 or the intermediary distribution server 400, which creates the one-way matrix (A) 740. The one-way matrix (A) 740 is a hash of the absolute information. In some embodiments, a second mobile device 250 receives the hashed absolute information. In other embodiments, the first mobile device 200 or an intermediary distribution server 400 solves for a signature vector (x) 750 from Ax=0. In these embodiments, the second mobile device 250 receives the signature vector (x) 750 of the one-way matrix (A) or the hashed absolute information.

The second mobile device 250 using a geofence does not know what transmitters 700 create a particular hash without first being in range of that transmitter 700 to check a transmitter's hash, as explained below. For example, assume the transmitter 700 is an access point and the absolute information is a MAC address. Instead of transmitting the MAC address as part of the transmitter information, the MAC address is used as an input to a hash function. The output of the hash function is used to hash the transmitter information and thus a hashed geofence. Due to the limited number of bits (e.g., 6 octets, 6 bytes or 48 bits) in a MAC address, the hashed absolute information may be theoretically "reversed" by sorting output values from all possible input values applied to a hash function. For larger length input values, such reverse engineering of the hash function becomes impractical.

In FIG. 28, a signature (x) 750 of the one-way matrix (A) is sent from the first mobile device 200 to the second mobile device 250. Again, a hash function is used here as an example of a one-way function. Rather than communicating either the unhashed absolute information in the clear or a hash of the absolute information, a signature (x) 750 of the hash of the absolute information is communicated, as explained in more detail below. Communicating a signature (x) 750 often requires less bandwidth than communicating a set of absolute information or the one-way matrix (A) 740. The first mobile device 200 and the second mobile device 250 may be the same mobile device or different mobile devices. The first mobile device 200 and the second mobile device 250 may communicate directly in a point-to-point fashion or indirectly through a distribution server 400.

Figure 29:
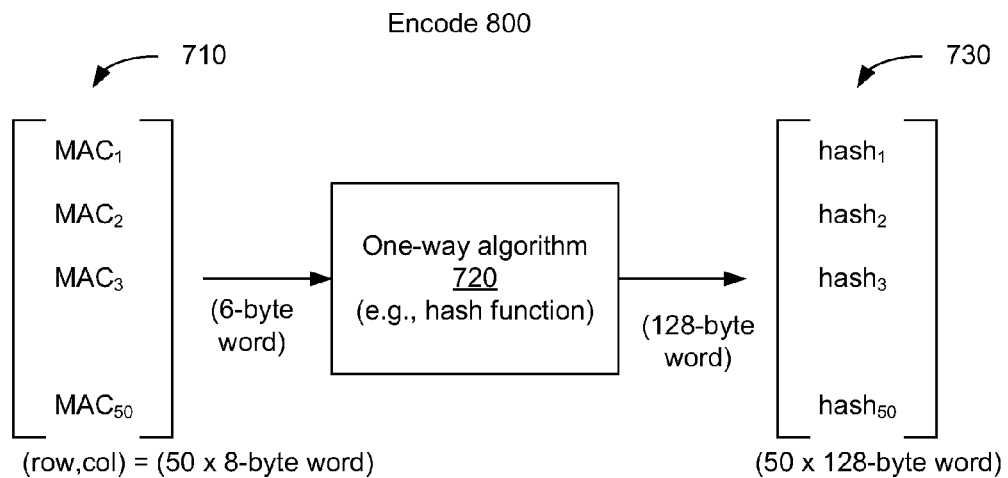
FIGS. 29 and 30 show a method to encode MAC addresses by applying a one-way function, in accordance with some embodiments of the present invention.
Figure 30:
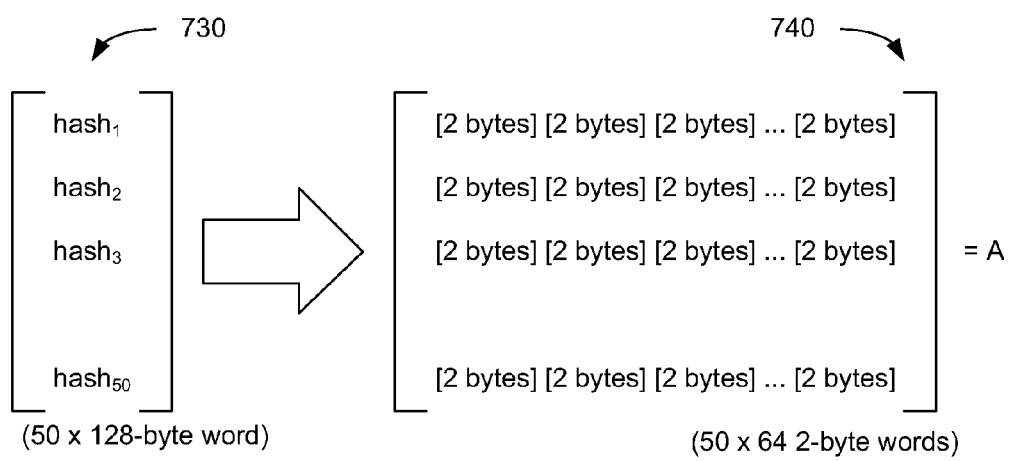

FIGS. 29 and 30 show a method to encode MAC addresses by applying a one-way function, in accordance with some embodiments of the present invention. For example purposes, up to 50 access points, each identified with a 6-byte MAC address, are considered. A length of 50 transmitters 700 is considered a practical maximum number of transmitters 700 that can be received from one location, however, for a large geofenced area with a large number of fingerprints 150, the maximum number of transmitters may be substantially higher. Examples presented here have arbitrarily been set to 50. Instead of 50, a lower number may be used (e.g., 40, 30 or 20) or a higher number may be use (e.g., 100, 1000 or 10000).

In FIG. 29, a MAC vector 710 contains up to 50 MAC addresses. Here, data applied to a one-way algorithm 720 (e.g., a hash function) results in a value. Each element of the MAC vector 710 is applied to the one-way algorithm 720 and results in a one-way vector (h) 730. If a lower number of transmitters 700 are detected when making an RF fingerprint 150, extra positions in the vector may be zero filled. Each element of the MAC vector 710 is applied to one-way function such as a cryptographic hash algorithm or cryptographic hash function. In the text that follows, we will use the terms "hash algorithm" and "hash function" to refer to "cryptographic hash algorithm" and "cryptographic hash function" as an example of any one-way algorithm or one-way function. For the particular hash algorithm selected, an input is 6 bytes long (6-byte word) and an output is 128 bytes long (128-byte word). That is, to obscure the 6-byte MAC address, the hash algorithm returns a 128 byte output. The hash algorithm is a one-way function meaning that an input leads to an output through a function that cannot be reversed. The result of component-wise hashing of the MAC vector 710 of 6-byte elements ($MAC_1$, $MAC_2$, $MAC_3$, ... $MAC_{50}$) is a vector of 128-byte elements ($hash_1$, $hash_2$, $hash_3$, ... , $hash_{50}$). In the case shown, the hash algorithm converts a 6-byte word for 50 transmitters 700 (shown as a column vector of 50 elements defining MAC vector 710) into a 128-byte word for the 50 transmitter 700 (to result in a column vector of 50 elements defining one-way vector (h) 730).

In FIG. 30, the one-way vector (h) 730 is translated to 64 2-byte words by 50 matrix to define one-way matrix (A) 740. That is, one 128-byte element is subdivided into 64 segments that are 2 bytes each. Each 2-byte segment is in turn represented as an element in the Galois field of $2^{16}$ elements depicted as $GF(2^{16})$. For information on Galois fields (finite fields), please refer to by Lidl, Rudolf; Niederreiter, Harald (1997), Finite Fields (2nd ed.), Cambridge University Press, ISBN 0-521-39231-4. Therefore, a 50 by 1 vector is converted to a 50 by 64 matrix. For example, a MAC vector 710 is converted to a one-way vector (h) 730. The number of subdivisions is arbitrary as long as the number of transmitters 700 (here 50) is less than the number of subdivisions (here 64). The resulting subdivided hash values in matrix form are referred to as the 'A' matrix, the hash matrix (A), or the one-way matrix (A) 740. As shown, the one-way matrix (A) 740 is 50 by 64. In the description that follows, all algebraic operations are performed over $GF(2^{16})$ without further specification.

FIG. 31 shows a relationship between a one-way matrix (A) 740 and a signature (x) 750, both defined over $GF(2^{16})$, in accordance with some embodiments of the present invention. The one-way matrix (A) 740 is derived from a one-way function. Another one-way function may be used, for example, a hash function, to create a one-way matrix (A). 740. A product of the one-way matrix (A) 740 and the signature (x) 750 is set to a zero vector (0). The matrix equation relating the one-way matrix (A) 740 to the signature (x) 750 is Ax=0.

In the example given, the one-way matrix (A) 740 is a 50 by 64 matrix, the signature (x) 750 is a 64 by 1 vector, and 0 is a 50 by 1 vector. Because the one-way matrix (A) 740 has a number of rows is less than the number of column (rows 50<columns 64), and both A and x are defined over a field (Galois field $GF(2^{16})$), the solution to Ax=0 is not unique. In other words, several possible solutions to Ax=0 exist. All solutions to x can be found following the Gaussian elimination algorithm in linear algebra. Among all solutions, one solution is selected at random as the signature (x) 750. Information on the Gaussian elimination algorithm can be found in David S. Dummit and Richard M. Foote, Abstract Algebra ($3^{rd}$ Edition), Wiley, ISBN-10: 0471433349.

FIG. 32 shows a method to decode a scanned MAC addresses by applying a one-way algorithm 720, in accordance with some embodiments of the present invention. A second mobile device 250 applying a geofence first receives a signature (x) 750 either directly from a first mobile device 200 or indirectly from a distribution server 400. To decode the signature (x) 750, a second mobile device 250 scans for MAC addresses. A found MAC address is an input to a one-way algorithm 720. The same one-way algorithm 720 used to encode the geofence is used in the decoding process. As shown, the MAC address found during a scan becomes a 6-byte input to the one-way algorithm 720 (e.g., padded by "00" or concatenated with a type index), which results in a 128-byte output. Again the hash is subdivided into 2-byte segments to result in a one-way vector (h) 760 with 1 row and 64 columns. For convenience of display, the figure shows a transpose ($h^T$) of the one-way vector (h) 760 as a column vector of 64 elements.

Though the figure shows a MAC address of an access point as the absolute information that is hashed, absolute information from another transmitter 700 may be hashed. For example, the cell ID from a cellular transmitter or other WWAN transmitter may be encoded and decoded with the one-way algorithm 720. A universal unique identifier from a Bluetooth transmitter or other personal area network (PAN) may also be encoded and decoded with a hash algorithm. Similarly, an identifier from a near-field communication (NFC) transmitter may be encoded and decoded with a hash algorithm.

FIG. 33 shows a relationship between a one-way vector (h) 760 and a signature (x) 750, in accordance with some embodiments of the present invention. To determine whether a scanned transmitter belongs to a particular geofence, a matrix product of the one-way vector (h) 760 and the signature (x) 750 is formed, over $GF(2^{16})$. The vector equation relating the one-way vector (h) 760 to the signature (x) 750 is: hx=0.

In the example given, the one-way vector (h) 760 is a row vector of 64 elements, the signature (x) 750 is a column vector of 64 elements, and the resulting product is a scalar (1 by 1). If the result is zero, the scanned transmitter is most likely in the geofence. If the result is not zero, the scanned transmitter is not in the geofence. In this manner, if a first mobile device 200 is not within the reception area of a transmitter 700 in the geofence, the location of the geofence remains unknown.

Figure 34:
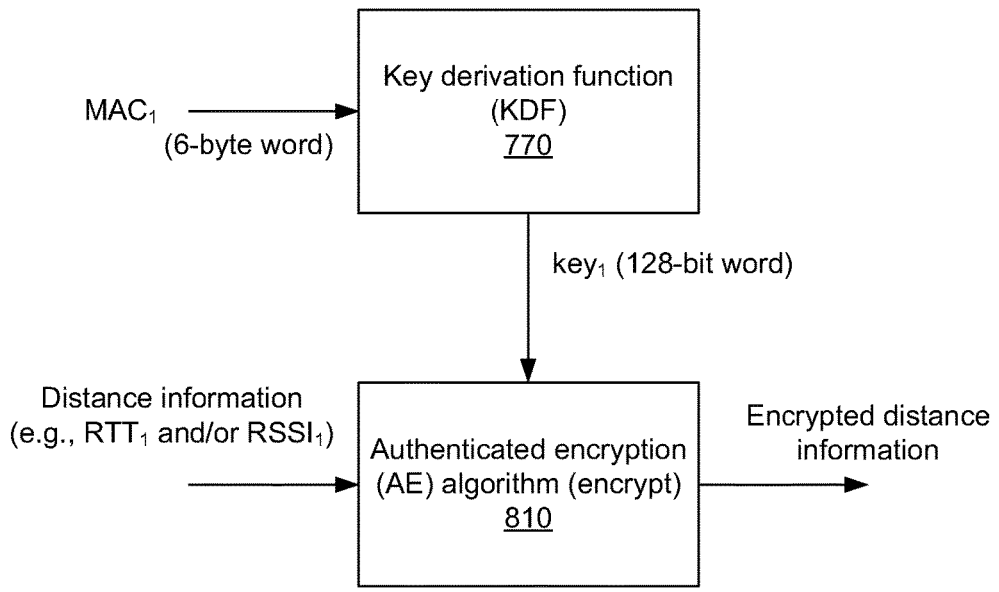
FIGS. 34 and 35 show a method to encode and decode distance information, respectively, in accordance with some embodiments of the present invention.
Figure 35:
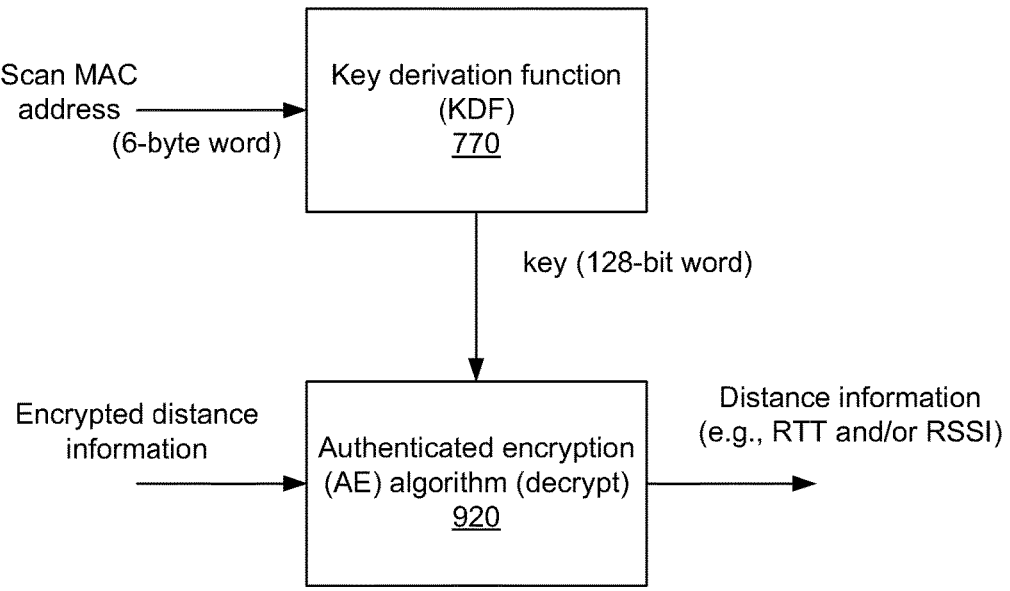

FIGS. 34 and 35 show a method to encode and decode distance information, respectively, in accordance with some embodiments of the present invention. The relative information includes distance information such as RTT and/or RSSI. Again, a MAC address is shown but other absolute information may be used.

In FIG. 34, a MAC address is the input parameter to a key derivation function (KDF) 770 in the encoder. The KDF 770 shown uses a 6-byte word or an 8-byte word as an input, which results in a 128-bit or 16-byte output. The input length of the KDF 770 may be regulated by the longest expected absolute information. If the length of the input to the KDF 770 is longer than the absolute information, the input may be zero padded. Meanwhile, distance information (such as at RTT or RSSI) is provided to an authenticated encryption (AE) algorithm 810, which used the key just determined to encrypt the distance information. The output of the AE algorithm 810 is the encrypted distance information. The encrypted distance information is sent from the first mobile device 200 to the second mobile device 250 either directly or via a distribution server 400.

In FIG. 35, a scan reveals a MAC address. The scanned MAC address is an input to a duplicate KDF 770 in the decoder. That is, the KDF 770 used during encoding is equivalent to the KDF 770 used during the decryption. The output of the KDF 770 is a key. In the case shown, a 6-byte input is converted to at 128-bit output where the absolute information is a MAC address and the output of the KDF 770 is a key. Next, the encrypted distance information is entered to an AE algorithm 920. The AE algorithm 920 in the decoder decrypts and the AE algorithm 810 in the encoder encrypts. The AE algorithm 920 also receives the key from the KDF 770. The AE algorithm 920 outputs the decrypted distance information if the correct key is generated from the KDF 770. If an improper key is used, the AE algorithm 920 generates an error signal that indicates the decoding results are erroneous or unauthenticated.

Figure 36:
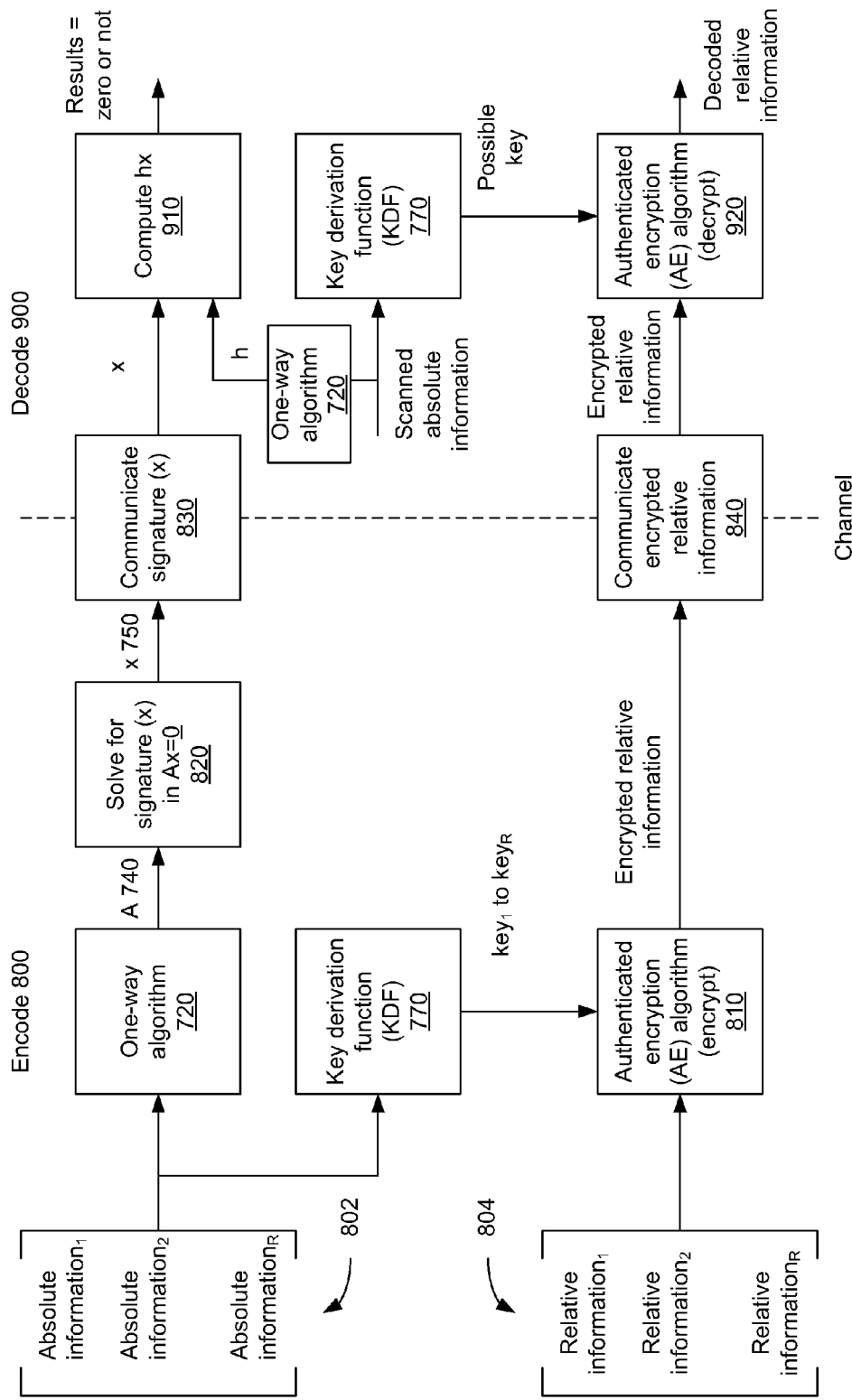
FIG. 36 shows a process to encrypt and decrypt both absolute and relative information, which define a geofence, in accordance with some embodiments of the present invention.

FIG. 36 shows a process to encrypt 800 and decrypt 900 both absolute and relative information, which define a geofence, in accordance with some embodiments of the present invention. A geofence is defined by a first vector 802 containing absolute information for a number of transmitters 700. Optionally, a second vector 804 contains corresponding relative information for the transmitters 700. To encode the geofence, the individual absolute information (e.g., absolute $information_1$ just collected by the first mobile device) becomes input to a hash algorithm or other one-way algorithm 720. The resulting hash is subdivided for each transmitter resulting in a one-way matrix (A) 740 for all transmitters 700 in the geofence. In 820, a signature (x) 750 is solved from Ax=0. The signature (x) 750 results in Ax being equal to zero. The signature (x) 750 is non-trivial (not equal to a zero vector) and not unique. The signature (x) 750 may be a random one of the solutions for from the matrix equation Ax=0. In some embodiments at 830, the signature (x) 750 is communicated from the first mobile device 200 to a second mobile device 250. The first mobile device 200 defines and may encode or encrypt the geofence. Alternatively, encoding may occur on a distribution server 400. The second mobile device 250 applies the geofence to determine when the second mobile device 250 crosses a line defined by the geofence.

The second mobile device 250 scans for absolute information. Found absolute information enters the one-way algorithm 720 and emerges has a one-way vector (h) 760. At 910, the second mobile device 250 performs a scalar product of the signature (x) 750 and the one-way vector (h) 760 to compute the inner product hx and determine if the scalar product of hx is zero. If not zero, the transmitter 700 is not within an RF fingerprint 150. If zero, the found absolute information has likely found transmitter 700 in the RF fingerprint 750 in the geofence. This process may repeat for each absolute information found during the scan.

In some embodiments, relative information is also collected and used in a geofence. To encode the relative information, a key is generated by a KDF 770 using the absolute information as input. The key is used by an AE algorithm 810 to encrypt the relative information. For example, absolute $information_1$ generates $key_1$ and is applied to an AE algorithm 810 converting relative information$_1$ to encrypted relative information$_1$. At 840, the encrypted relative information is communicated to the second mobile device 250. The encrypted relative information may be sent directly from the first mobile device 200 or indirectly from a distribution server 400 or a position determining entity (PDE) or the like as assistance data (AD).

As discussed above, the second mobile device 250 scans for absolute information. Found absolute information enters KDF 770 and emerges has a possible key. At 920, the second mobile device 250 applies the key (when hx=0) to the AE algorithm 920 to decrypt the relative information. When hx<>0, then a transmitter 700 in an RF fingerprint has not been identified. The second mobile device 250 can only determine a rough location of the RF fingerprint 150 when not all of the absolute information is scanned and found by the first mobile device 200. This process may repeat for each absolute information found during the scan.

During encryption, if absolute information is used with more than one RF fingerprint 150 with absolute information paired with relative information, the RF fingerprint 150 may be indexed. For example, if 100 RF fingerprints are taken at a corresponding 100 locations to create a geofence, each RF fingerprint 150 may be indexed by a number 0 to 99. The absolute information may be concatenated with the index before entering the KDF 770 thereby creating a unique key for each absolute information-index pair. In this manner each RF fingerprint 150 has a unique index associated with it and each absolute information-index pair creates a valid key for the AE algorithm 810. For example, a particular MAC address and index both associated with an RF fingerprint are feed into a KDF algorithm 810 to generate a key. This key is used by the AE algorithm 810 to encrypt the relative information.

During decryption, scanned absolute information may be concatenated with a generated index. For example, a maximum value of the generated index may be communicated within the assistance data carrying the encrypted relative information. Alternatively, the maximum value may be set as a maximum predetermined threshold value. For each scanned absolute information found to where hx is computed as 0, a generated index from one to the maximum value may be concatenated with the absolute information to generate a corresponding key for each index. For example, assistance data may communicate both the encrypted relative information and the number of RF fingerprints 150. If a MAC address matches the signature (by hx=0) then a set of keys may be generated by concatenating the scanned MAC address (absolute information) with a generated index to generate a possible key from the KDF 770 in the decoder. The possible keys may be applied to the encrypted relative information (e.g., encrypted RTT or RSSI) to determine an index for a possible RF fingerprint 150. After indexes for a set of keys decode possible relative information, only these indexes are concatenated with the scanned absolute information thereby limiting processing computation.

Alternatively, or in addition to, a type index (e.g., a 2-bit index) may be used to communicate what type of receiver was used in the RF fingerprint collection. This type index may be used to distinguish different absolute information have the same identifier. For example, "00" means a Cell ID receiver was used, "01" means a MAC address receiver was used and "10" means a Bluetooth receiver was used. The type index is concatenated to the absolute information before executing the hash algorithm in the encoder for the first mobile device 200. In the decoder, an index of the receiver-type is similarly concatenated by the second mobile device 250 thereby distinguishing two transmitters that may happen to have an identical identifier. For example, an access point MAC address of "00:00:00:00:12:34" appears identical to a Bluetooth MAC address of "00:00:00:00:12:34." Appending the access point MAC address results in "{01,00,00,00,00,12,34}" and appending the Bluetooth MAC address results in "{10,00,00,00,00,12,34}" being applied to the one-way algorithm 720 and the KDF 770 thereby guaranteeing a unique hash result and a unique key, respectfully.

In some embodiments during the decryption process, only a maximum threshold number of scanned absolute information is processed to determine an RF fingerprint 150. For example, up to five MAC addresses (from AP with the five strongest signals) may be used to find an RF fingerprint 150. The same number or more absolute information is used for encoding or encrypting.

Figure 37:
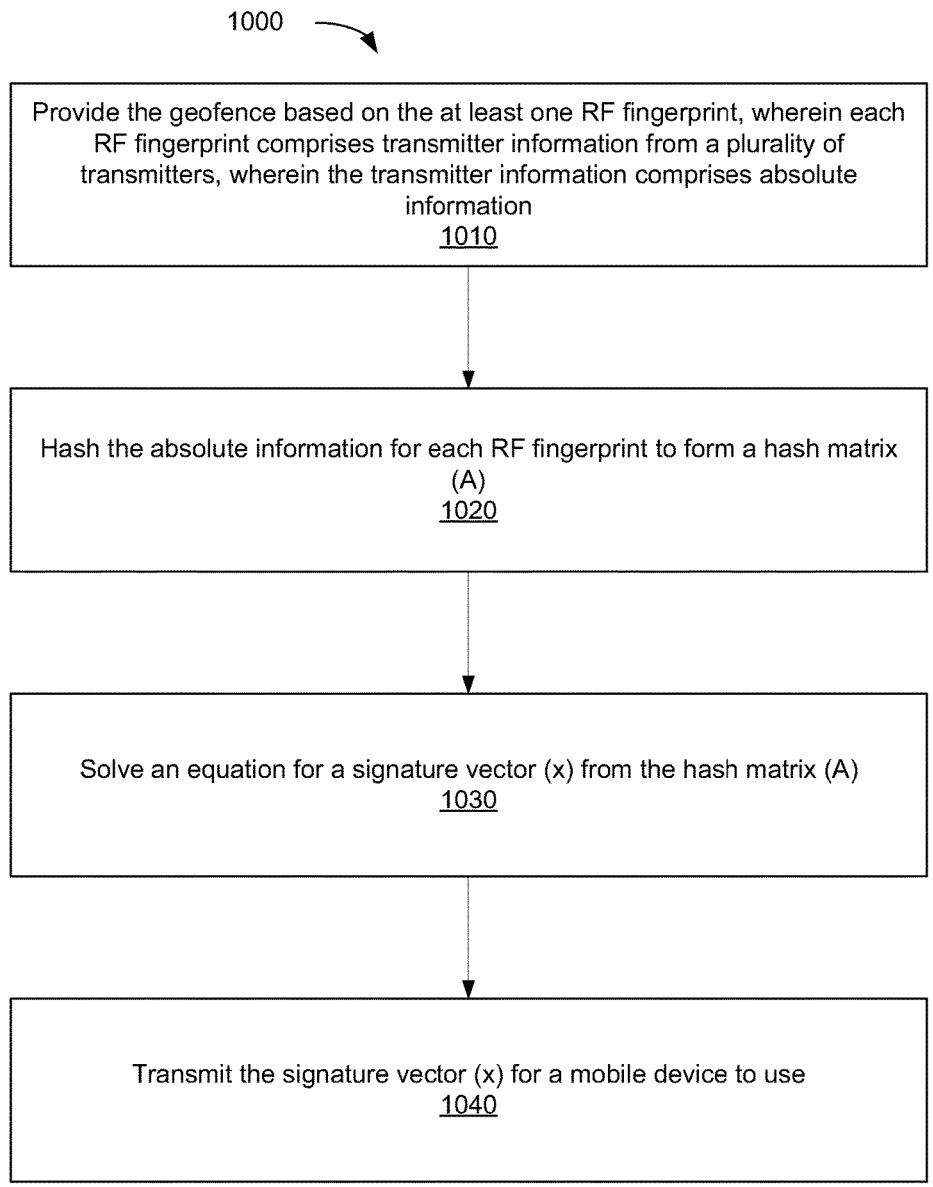
FIGS. 37 and 38 show methods to communicate and use a geofence, in accordance with some embodiments of the present invention.
Figure 38:
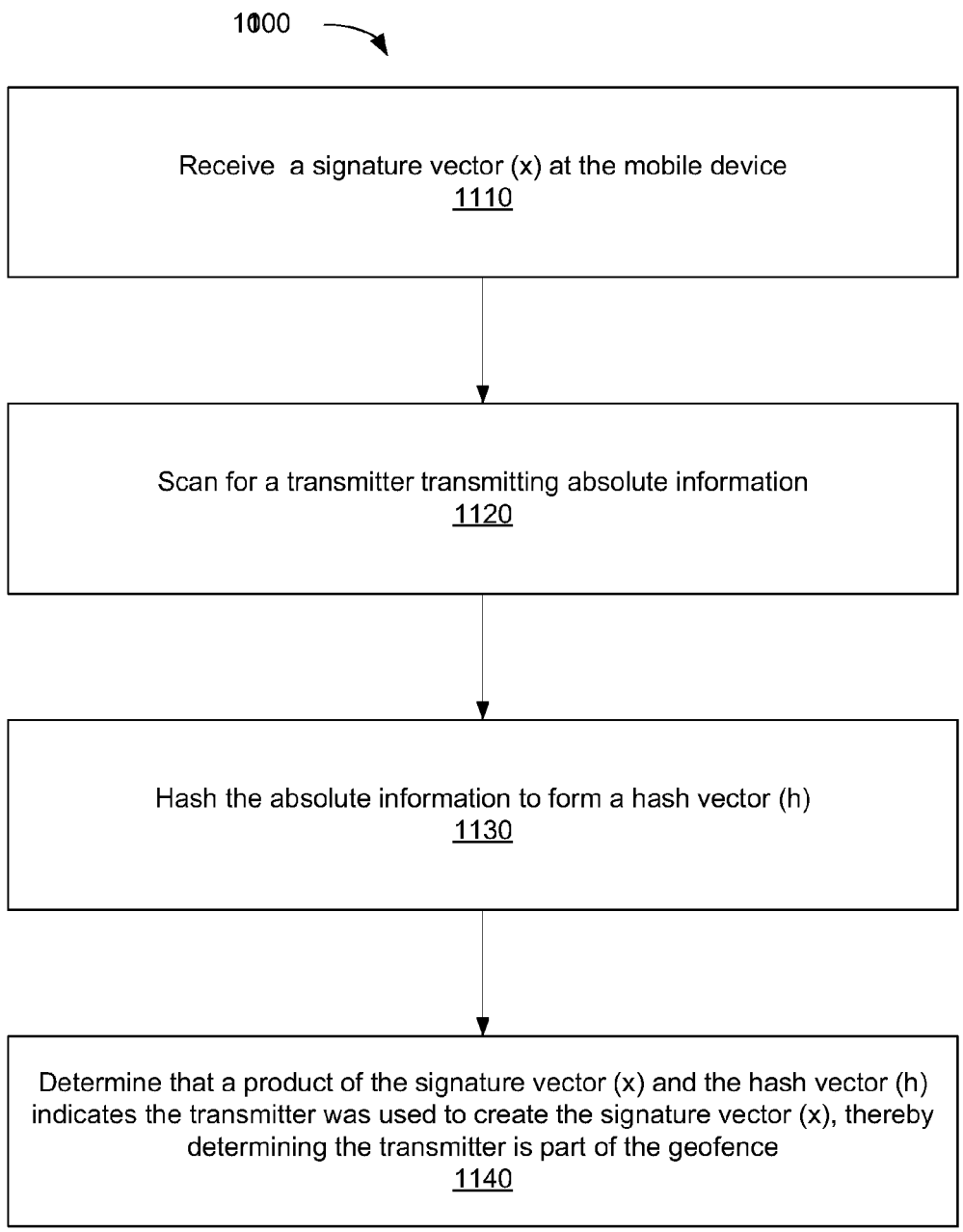

FIGS. 37 and 38 show methods to communicate and use a geofence, in accordance with some embodiments of the present invention.

In FIG. 37, shown is a method 1000 for communicating a geofence. At 1010, a first mobile device 200 provides the geofence based on the at least one RF fingerprint 150, wherein each RF fingerprint 150 comprises transmitter information from a plurality of transmitters 700, wherein the transmitter information comprises absolute information. Next at 1020, the first mobile device 200 hashes the absolute information for each RF fingerprint 150 to form a one-way matrix (A) 740. At 1030, the first mobile device 200 solves an equation (or system of equations) for a signature (x) 750 from the one-way matrix (A) 740. At 1040, the first mobile device 200 transmits the signature vector (x) 750 for a second mobile device 250 to use.

In FIG. 38, shown is a method 1100 for using a geofence by a second mobile device 250. At 1110, the second mobile device 250 receives a signature vector (x) 750. At 1120, the second mobile device 250 scans for a transmitter 700 transmitting absolute information. At 1130, the second mobile device 250 hashes the absolute information to form a one-way vector (h) 760. At 1140, the second mobile device 250 determines that a product of the signature vector (x) 750 and the one-way vector (h) 760 indicates the transmitter was used to create the signature vector (x) 750, thereby determining the transmitter is part of the geofence.

Figure 39:
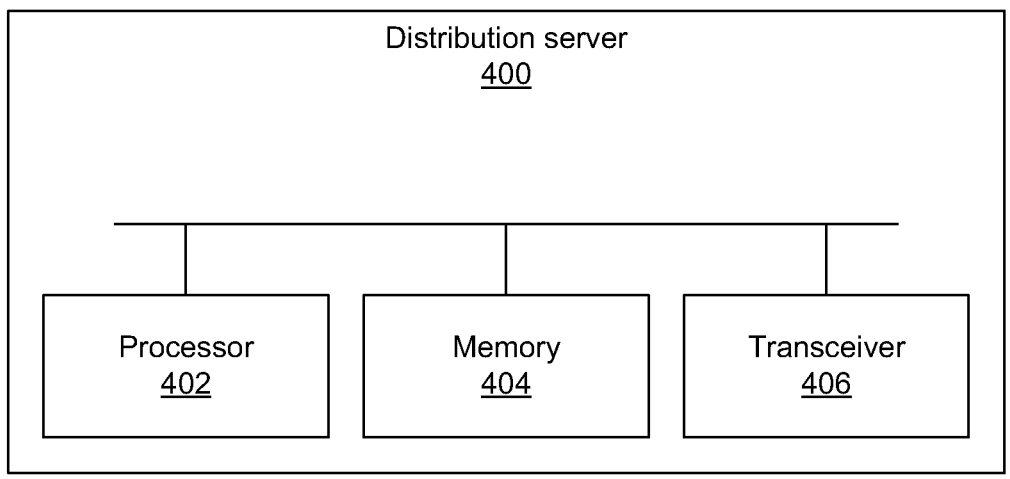
FIG. 39 shows an optional distribution server, in accordance with some embodiments of the present invention.

FIG. 39 shows an optional distribution server 400, in accordance with some embodiments of the present invention. The distribution server 400 includes a process 402, memory 404 and a transceiver 406. The processor 402 may be implemented with one or more processing units, which are described below. The memory 404 contains software modules to receive a first transmission, which includes a geofence, a one-way matrix (A) or a signature (x) of a one-way matrix (A). The memory 404 also contains software modules to transmit a second transmission, which includes a geofence, a one-way matrix (A) or a signature (x) of a one-way matrix (A). If a geofence is received in the first transmission, the distribution server 400 may simply transmit the geofence or alternatively may convert the geofence to a one-way matrix (A) or a signature (x) before transmitting the second transmission. If a one-way matrix (A) is received in the first transmission, the distribution server 400 may simply transmit the one-way matrix (A) or alternatively may convert the one-way matrix (A) to a signature (x) and then transmit the signature (x) in the second transmission. The transceiver 406 includes a receiver to receive the first transmission and a transmitter to transmit the second transmission.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method of determining a breach of a geofence in a mobile device comprising:
   obtaining, at the mobile device, a reference radio frequency (RF) fingerprint, the reference RF fingerprint defining the geofence, wherein the reference RF fingerprint comprises absolute information for a plurality of transmitters and relative information that describes distance information from the plurality of transmitters;
   scanning RF signals received by the mobile device;
   determining a scanned RF fingerprint based on the scanning; and
   determining if the breach of the geofence has occurred by comparing the reference RF fingerprint to the scanned RF fingerprint.

2. The method of claim 1, wherein the obtaining, at the mobile device, the reference RF fingerprint comprises one of generating the reference RF fingerprint defining the geofence by the mobile device or receiving the reference RF fingerprint defining the geofence by the mobile device directly or indirectly from a different mobile device.

3. The method of claim 1, wherein the reference RF fingerprint comprises a record of an RF environment at a location, and at least one of uncertainty, coarseness or granularity added to the RF environment defines an area inside the geofence.

4. The method of claim 3, wherein determining if the breach of the geofence has occurred comprises determining if the mobile device has left the area inside the geofence or entered the area inside the geofence.

5. The method of claim 1, wherein the absolute information comprises at least one of an NFC identifier (near-field communication identifier), a unique identity of the plurality of transmitters, or a location of the plurality of transmitters.

6. The method of claim 1, wherein the relative information describes the distance information from the plurality of transmitters using at least one of received signal strength indicator (RSSI) or round-trip time (RTT).

7. The method of claim 1, further comprising obtaining, at the mobile device, a plurality of reference RF fingerprints, the plurality of reference RF fingerprints further defining the geofence.

8. The method of claim 7, wherein the plurality of RF fingerprints defines at least one or a closed path and an open-loop path.

9. The method of claim 1, further comprising waking an application in the mobile device based on the breach of the geofence occurring.

10. A mobile device for determining a breach of a geofence, the mobile device comprising:
    at least one of a wireless wide area network (WWAN) transceiver and a wireless local area network (WLAN) transceiver; and
    a processor coupled to the at least one of the WWAN transceiver and the WLAN transceiver and configured to obtain a reference radio frequency (RF) fingerprint, wherein the reference RF fingerprint comprises absolute information for a plurality of transmitters and relative information that describes distance information from the plurality of transmitters, the reference RF fingerprint defining the geofence, scan for RF signals with the at least one of the WWAN transceiver and the WLAN transceiver, determine a scanned RF fingerprint based on the scan for RF signals, and determine if the breach of the geofence has occurred by comparing the reference RF fingerprint to the scanned RF fingerprint.

11. The mobile device of claim 10, wherein the processor is configured to obtain the reference RF fingerprint by being configured to generate the reference RF fingerprint defining the geofence or receive the reference RF fingerprint defining the geofence with the at least one of the WWAN transceiver and the WLAN transceiver directly or indirectly from a different mobile device.

12. The mobile device of claim 10, wherein the reference RF fingerprint comprises a record of an RF environment at a location, and at least one of uncertainty, coarseness or granularity added to the RF environment defines an area inside the geofence.

13. The mobile device of claim 12, wherein the processor is configured to determine if the breach of the geofence has occurred by being configured to determine if the mobile device has left the area inside the geofence or entered the area inside the geofence.

14. The mobile device of claim 10, wherein the absolute information comprises at least one of an NFC identifier (near-field communication identifier), a unique identity of the plurality of transmitters, or a location of the plurality of transmitters.

15. The mobile device of claim 10, wherein the relative information describes the distance information from the plurality of transmitters using at least one of received signal strength indicator (RSSI) or round-trip time (RTT).

16. The mobile device of claim 10, wherein the processor is further configured to obtain a plurality of reference RF fingerprints, the plurality of reference RF fingerprints further defining the geofence.

17. The mobile device of claim 16, wherein the plurality of RF fingerprints defines at least one or a closed path and an open-loop path.

18. The mobile device of claim 10, wherein the processor is further configured to wake an application based on the breach of the geofence occurring.

19. A mobile device for determining a breach of a geofence, the mobile device comprising:
    means for obtaining, at the mobile device, a reference radio frequency (RF) fingerprint, wherein the reference RF fingerprint comprises absolute information for a plurality of transmitters and relative information that describes distance information from the plurality of transmitters, the reference RF fingerprint defining the geofence;
    means for scanning RF signals received by the mobile device;
    means for determining a scanned RF fingerprint based on the scanning; and
    means for determining if the breach of the geofence has occurred by comparing the reference RF fingerprint to the scanned RF fingerprint.

20. The mobile device of claim 19, wherein the means for obtaining, at the mobile device, the reference RF fingerprint comprises one of a means for generating the reference RF fingerprint defining the geofence or means for receiving the reference RF fingerprint defining the geofence directly or indirectly from a different mobile device.

21. The mobile device of claim 19, wherein the reference RF fingerprint comprises a record of an RF environment at a location, and at least one of uncertainty, coarseness or granularity added to the RF environment defines an area inside the geofence.

22. The mobile device of claim 21, wherein the means for determining if the breach of the geofence has occurred comprises means for determining if the mobile device has left the area inside the geofence or entered the area inside the geofence.

23. The mobile device of claim 19, wherein the absolute information comprises at least one of an NFC identifier (near-field communication identifier), a unique identity of the plurality of transmitters, or a location of the plurality of transmitters.

24. The mobile device of claim 19, wherein the relative information describes the distance information from the plurality of transmitters using at least one of received signal strength indicator (RSSI) or round-trip time (RTT).

25. A non-transient computer-readable storage medium including program code stored thereon for a mobile device to determine a breach of a geofence, comprising program code to:
    obtain, at the mobile device, a reference radio frequency (RF) fingerprint, wherein the reference RF fingerprint comprises absolute information for a plurality of transmitters and relative information that describes distance information from the plurality of transmitters, the reference RF fingerprint defining the geofence;
    scan for RF signals received by the mobile device;
    determine a scanned RF fingerprint based on the scan for RF signals; and
    determine if the breach of the geofence has occurred by comparing the reference RF fingerprint to the scanned RF fingerprint.

26. The non-transient computer-readable storage medium of claim 25, wherein the program code to obtain, at the mobile device, the reference RF fingerprint comprises one of program code to generate the reference RF fingerprint defining the geofence or program code to receive the reference RF fingerprint defining the geofence by the mobile device directly or indirectly from a different mobile device.

27. The non-transient computer-readable storage medium of claim 25, wherein the reference RF fingerprint comprises a record of an RF environment at a location, and at least one of uncertainty, coarseness or granularity added to the RF environment defines an area inside the geofence.

28. The non-transient computer-readable storage medium of claim 27, wherein the program code to determine if the breach of the geofence has occurred comprises program code to determine if the mobile device has left the area inside the geofence or entered the area inside the geofence.

29. The non-transient computer-readable storage medium of claim 25, wherein the absolute information comprises at least one of an NFC identifier (near-field communication identifier), a unique identity of the plurality of transmitters, or a location of the plurality of transmitters.

30. The non-transient computer-readable storage medium of claim 25, wherein the relative information describes the distance information from the plurality of transmitters using at least one of received signal strength indicator (RSSI) or round-trip time (RTT).

31. The method of claim 1, wherein the absolute information is obtained at a different time than the relative information.

* * * * *